United States Patent [19]

Hoberman et al.

[11] Patent Number: 4,575,801

[45] Date of Patent: Mar. 11, 1986

[54] SUBMETERING APPARATUS

[75] Inventors: Kenneth H. Hoberman; Kim J. Kirwan, both of Omaha, Nebr.

[73] Assignee: GRH Electronics, Inc., Omaha, Nebr.

[21] Appl. No.: 490,020

[22] Filed: Apr. 29, 1983

[51] Int. Cl.[4] ........................ G01K 17/06; G06F 15/56

[52] U.S. Cl. ........................................ 364/483; 364/492

[58] Field of Search ............... 364/464, 483, 557, 480, 364/550, 492; 165/11 R

[56] References Cited

U.S. PATENT DOCUMENTS

| | | | |
|---|---|---|---|
| 3,590,220 | 6/1971 | Ishida | 235/61.9 |
| 3,820,075 | 6/1974 | Ebner | 340/172.5 |
| 3,995,686 | 12/1976 | Laube | 165/11 R |
| 4,049,044 | 9/1977 | Cohen | 165/11 R |
| 4,051,998 | 10/1977 | Zabel | 364/465 |
| 4,166,975 | 9/1979 | Germer et al. | 364/483 X |
| 4,169,290 | 9/1979 | Reed et al. | 364/900 |
| 4,216,529 | 8/1980 | Krystck et al. | 364/510 |
| 4,218,737 | 8/1980 | Buscher et al. | 364/493 |
| 4,234,927 | 11/1980 | First | 165/11 R X |
| 4,254,472 | 3/1981 | Juengel et al. | 364/900 |
| 4,261,037 | 4/1981 | Hicks | 364/464 |
| 4,291,376 | 9/1981 | McCahill | 364/483 |
| 4,296,727 | 10/1981 | Bryan | 165/11 R X |
| 4,306,293 | 12/1981 | Marathe | 364/557 |
| 4,351,028 | 9/1982 | Peddie et al. | 364/464 X |
| 4,360,877 | 11/1982 | Langston et al. | 364/465 |
| 4,363,441 | 12/1982 | Feinberg | 364/464 X |
| 4,484,620 | 11/1984 | McHugh | 165/11 R |

OTHER PUBLICATIONS

Energy Billing Systems, Inc.-info. sheet Energy Billing Systems, Inc.-info. bulletin on "Compu Bill 1000P & 2000P.

Natural Power, Inc. p. 33-BTU Meter Series 546 ZDC-Product Description on "Conserve A Therm" Model 1280.

*Primary Examiner*—Edward J. Wise

*Attorney, Agent, or Firm*—Henderson & Sturm

[57] ABSTRACT

A submetering apparatus that includes a power supply unit, an apartment monitoring unit, a main meter monitoring unit, a power failure detection unit, a power failure protection unit, a main processing unit and a memory unit. The apparatus further includes a display unit, a modem unit, a terminal unit, a control switch unit and a memory module unit. These units interact to allow the apparatus to monitor furnace on-time for individual apartment units and to store that data until needed and to calculate appropriate billing statements.

9 Claims, 23 Drawing Figures

Microfiche Appendix Included
(2 Microfiche, 147 Pages)

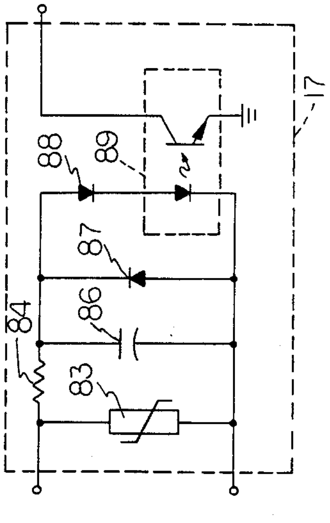
5A
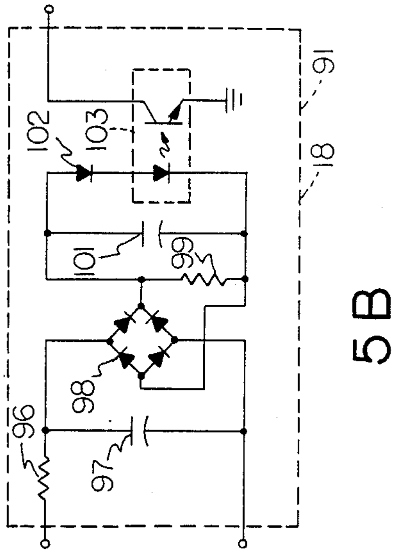
5B
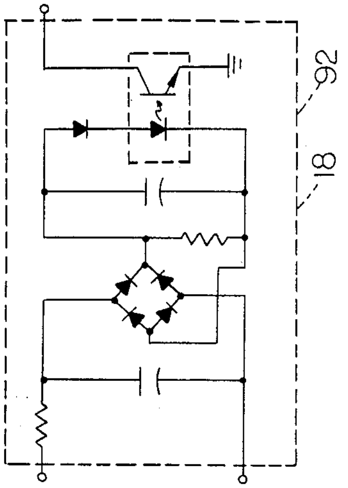
5C
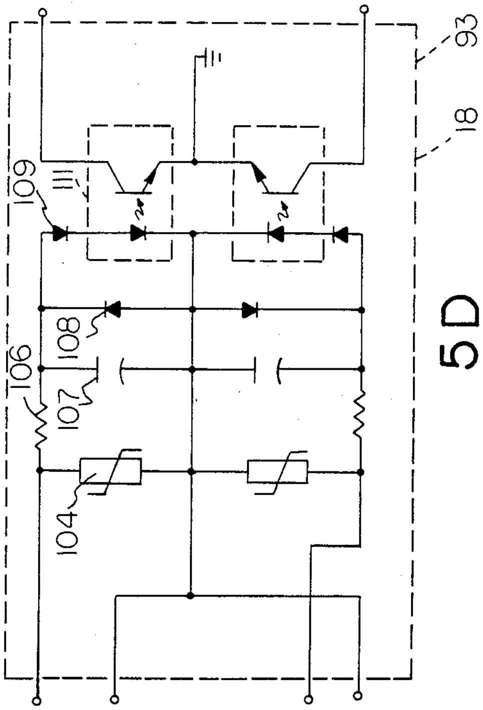
5D
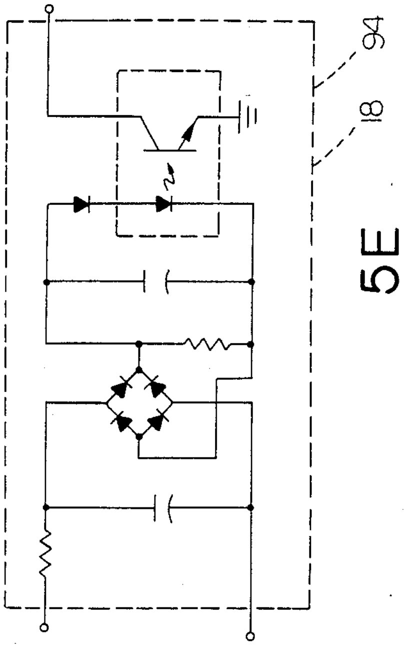
5E

SUBMETERING APPARATUS

This patent has an available, but unprinted, computer program appendix comprising 2 microfiche with 147 frames.

TECHNICAL FIELD

This invention relates generally to submetering apparatus.

BACKGROUND ART

Individual residences, apartment complexes, condominium units and the like are usually provided with various services, such as natural gas, electricity and water. Charges for use of such services are typically based upon consumption. The utilities that provide such services usually provide a meter to measure consumption with respect to a particular building so that the owner of the building may be appropriately charged.

Such utilities usually provide a single meter per monitored building. This well accomodates the needs of a user solely responsible for all consumption within a particular building. The provision of a single meter, however, poses problems for persons who are only partly responsible for consumption within a monitored building, as in an apartment or condominium structure.

Such users do have the option of having the service utility install a plurality of meters so that individual usage of each particular service can be monitored in a segregated manner. This, however, constitutes a very expensive alternative.

By default, then, many such users simply divide the total usage for the building as monitored by the main meter by the number of separate units that make up the building. Variations of this simple scheme exist as well. For instance, some users may impose some other calculation-by-division sheme that takes into account square footage, insulation factors and the like. Such schemes are usually inaccurate by their very nature and hence, do not necessarily result in fair rates to the users. In addition, such schemes do not encourage conservation since users have little motivation to limit their usage of the monitored service.

Many attempts have been made to provide inexpensive submetering apparatus. Most such systems provide a plurality of clocks that measure time when the monitored commodities are being used and that are quiescent when no consumption occurs. The bill for the individual users may then be calculated.

There are problems involved in creating a fair bill from this monitoring scheme. Perhaps more importantly, such systems may be susceptible to false signals that can affect the accuracy of the measured results. Also, such submetering systems impose record keeping and bill creation duties upon a landlord that can be significant with respect to to the usage of time.

Therefore, there exists a need for a relatively inexpensive submetering apparatus that is accurate, flexible, reliable and easily maintained.

DISCLOSURE OF THE INVENTION

The above problems are substantially resolved by the provision of the instant invention. The instant invention comprises a submetering apparatus that includes generally a main processing unit, a power supply unit, a power failure detection unit and a power failure protection unit, as well as a battery unit and memory unit.

The apparatus also includes an apartment monitoring unit, a main meter monitoring unit, a display unit, a modem unit, a terminal unit, a memory module unit and a control switch unit.

The main processing unit comprises a microprocessor, a peripheral interface unit for allowing the microprocessor to interact with other units, and an address decoder unit for implementing certain instructions of the microprocessor.

The main processing unit connects to a memory unit that includes a program for allowing the apparatus to monitor individual apartment usage as well as overall usage for the entire building. The program further allows the apparatus to calculate an appropriate bill for each monitored apartment and for the landlord as well.

The power supply unit provides appropriate power for the apparatus during normal usage, and the battery unit provides emergency power to preserve the data stored by the apparatus during power outages and for further allowing certain monitoring functions to continue.

The power failure detection unit operates by sensing an impending power failure. The power failure protection unit responds to such detection and operates to protect the apparatus' memory and the data stored therein during a power down situation.

The apparatus also includes a plurality of apartment monitoring units to monitor individual apartment furnaces. The apartment monitoring units provide information to the main processing unit regarding how long such furnaces are on, and hence, how long energy is being consumed. A main meter monitoring unit provides information to the main processing unit regarding overall servic usage for the entire monitored building.

The display unit provides information to the operator regarding current service usge per monitored area and current billing information for those same areas. Other display indicia provide visual signals for various operating modes and to implement other features of the apparatus.

The control switch unit allows an operator to control what the display unit depicts. It also allows the operator to control certain functions of the apparatus. A modem unit and terminal unit are provided to allow the apparatus to interact with data processing equipment, printers, terminals, keyboards, CRT's and the like.

The memory module unit allows an operator to accumulate billing and consumption data for a particular billing period for all monitored areas in an easily stored and easily transported memory unit. This memory unit may then be transported to a central processing area where the bills may be prepared.

BRIEF DESCRIPTION OF THE DRAWINGS

These and other attributes of the invention will become more clear upon a thorough study and review of the following description of the best mode for carrying out the invention, particularly when reviewed in conjunction with the drawings, wherein:

FIG. 5*a* provides a schematic diagram of one apartment monitoring unit;

FIGS. 5*b–e* provide schematic diagrams of the main meter monitoring units;

FIG. 6 provides a schematic diagram of the memory module unit;

BEST MODE FOR CARRYING OUT THE INVENTION

Figure 1:
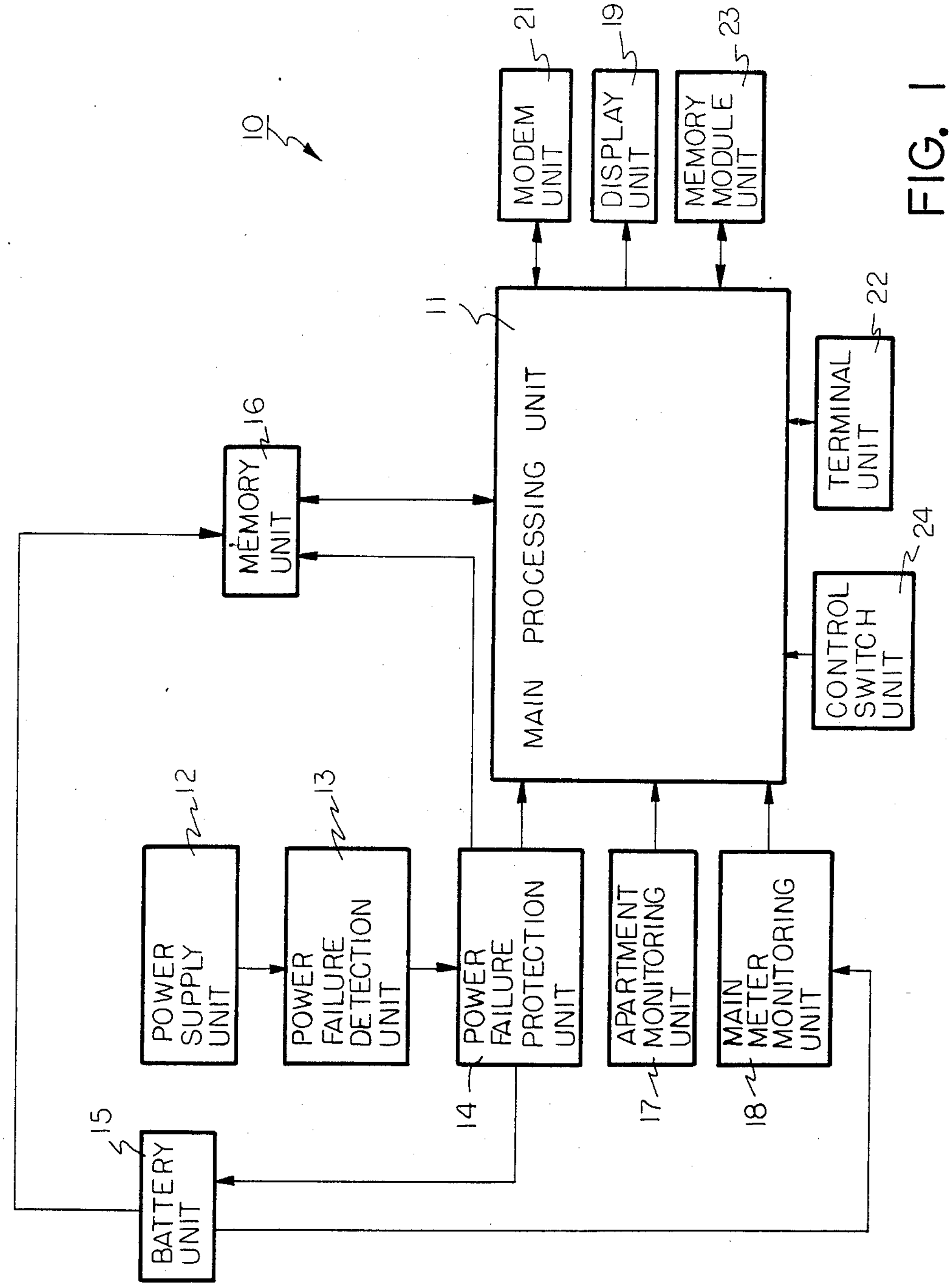
FIG. 1 provides a block diagram depiction of the apparatus.

Referring now to the drawings, and in particular to FIG. 1, the invention may be seen as depicted in block format as indicated in general by the numeral 10. The invention (10) includes a main processing unit (11), a power supply unit (12), a power failure detection unit (13), and a power failure protection unit (14). The invention (10) also includes a battery unit (15) and a memory unit (16).

The main processing unit (11) also connects to a plurality of apartment monitoring units (17) and to a main meter monitoring unit (18). In addition, the main processing unit (11) connects to a display unit (19), a modem unit (21), a terminal unit (22), a memory module unit (23), and a control switch unit (24).

Each of the above generally described units will now be described in more detail in seriatim fashion.

The Power Supply Unit

Figure 2:
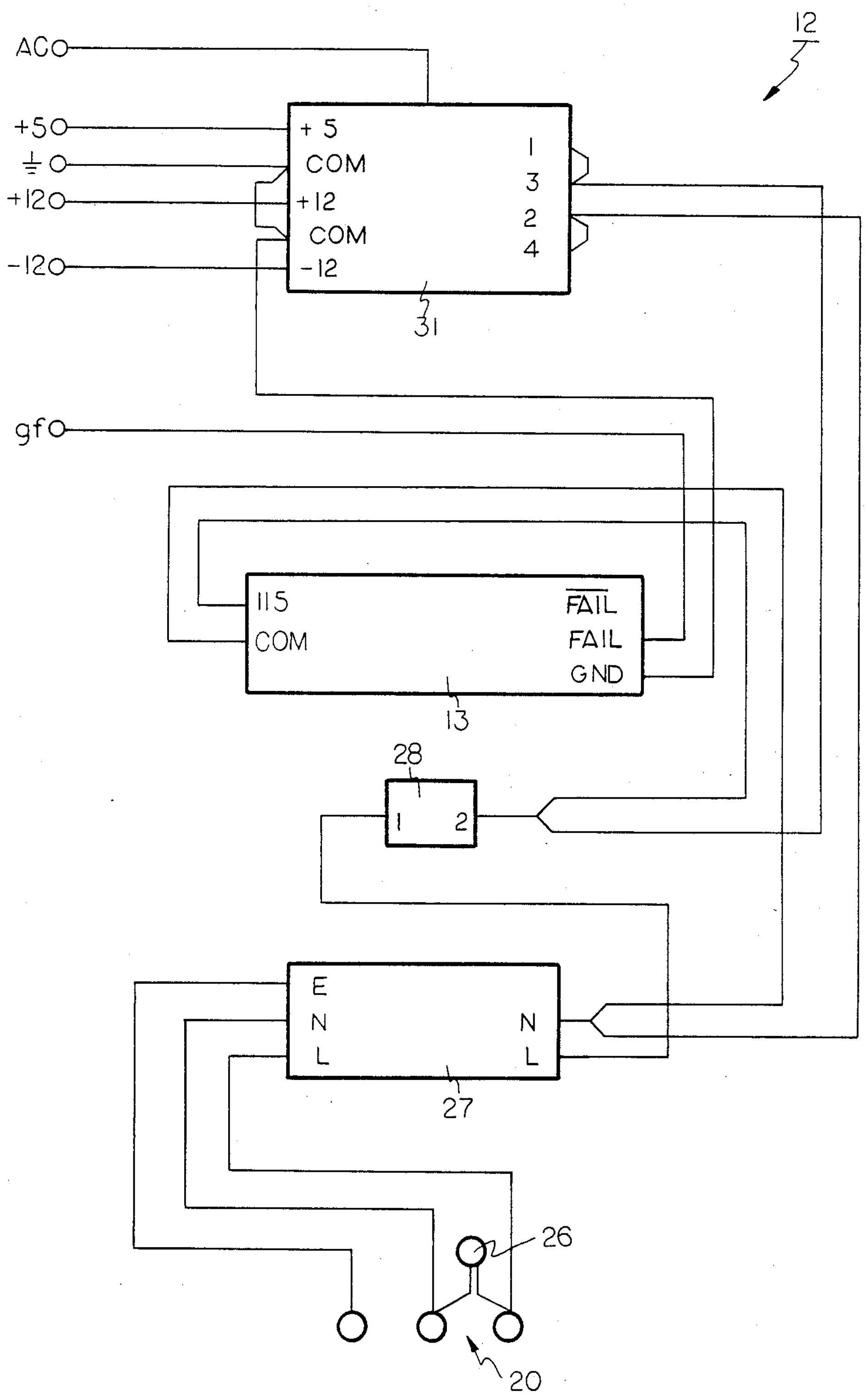
FIG. 2 provides a schematic diagram of the power supply unit and power failure detection unit.

With reference to FIG. 2, the power supply unit (12) includes appropriate terminals (20) for connection to a standard three line 120 volt 60 Hertz AC power source (not shown). A transient suppressor (26) (such as a General Electric part No. V130LA20B) connects across the neutral and line terminals to aid in suppressing unwanted voltage spikes. The earth, neutral and line leads all connect to the appropriate terminals of a line filter (27) (such as a Corcom part No. 3W1A).

The line lead output of the line filter (27) then connects through a circuit breaker (28) (such as E-T-A part No. 45-700-P10-DD) to both the 115 volt terminal of a power fail detection unit (13) and to the appropriate input terminal of a regulated power supply module (31) (such as Power-on part No. HBAA-40W-A). The neutral output terminal of the line filter (27) connects to both the common input terminal of the power failure detection unit (13) and to the appropriate input terminal port of the power supply module (31).

The ground terminal of the power failure detection unit (13) connects to the appropriate common terminal of the power supply module (31) mentioned above. The failure indication output of the power failure detection unit (13) connects to the power failure protection unit (14) as described below.

The Power Failure Detection Unit

The power failure detection unit (13) may be provided by a Power-One part No. PF-1. In order to ensure satisfactory operation of this part in conjunction with the invention (10) depicted, certain modifications have been made to this component.

More particularly, as obtained from the supplier, this component includes a single integrated circuit voltage comparator. The output of the voltage comparator connects through a single forward biased diode joined in series with a 10k ohm resistor to the base of a transistor.

The applicant has determined that this module will operate more satisfactorily in the environment intended upon replacing this single diode with three series connected diodes, such as part No. 1N914.

The Main Processing Unit

Figure 3A:
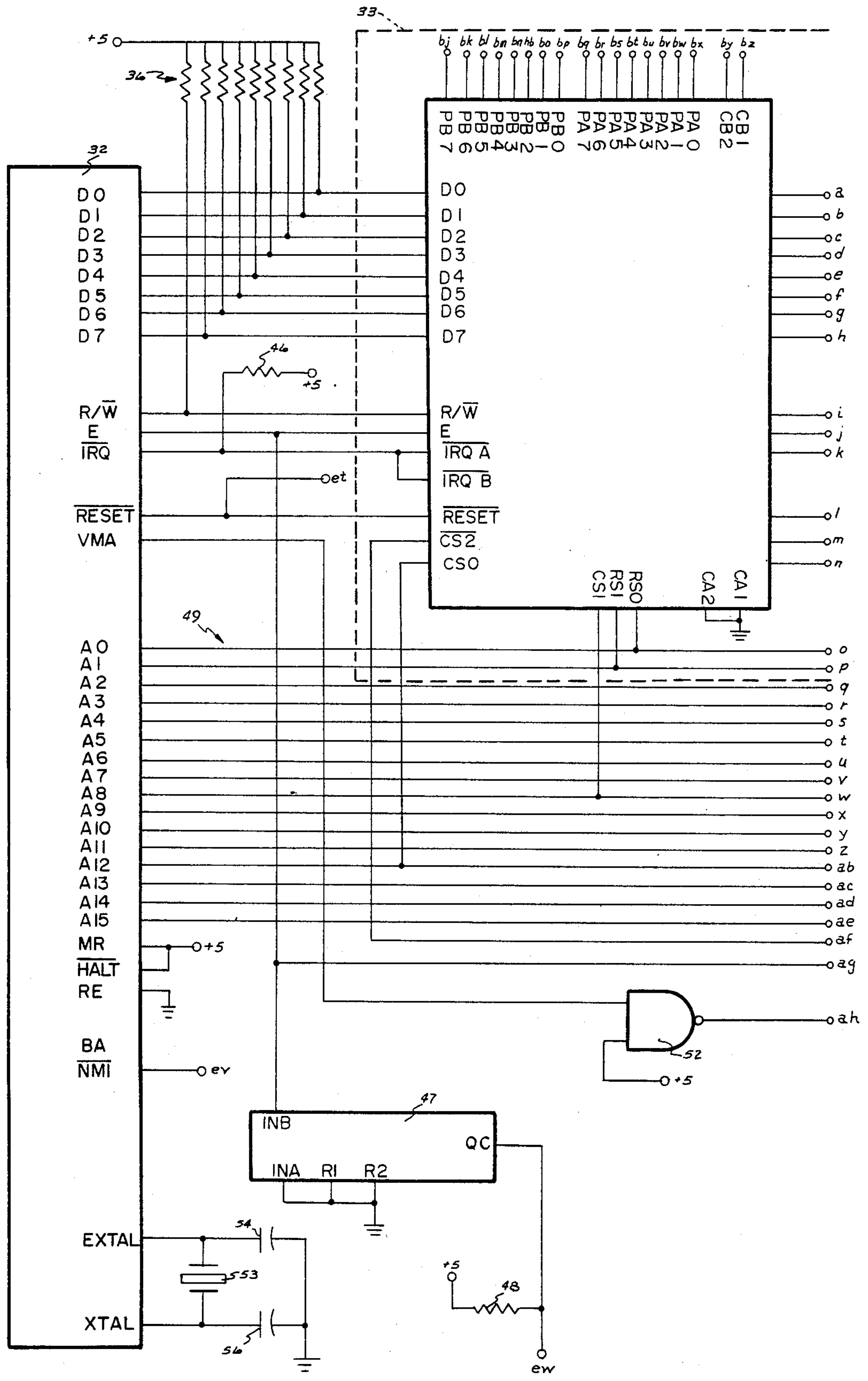
FIGS. 3*a–c* provides a schematic diagram of the main processing unit, including the microprocessor, the peripheral interface unit and the address decoder unit.
Figure 3B:
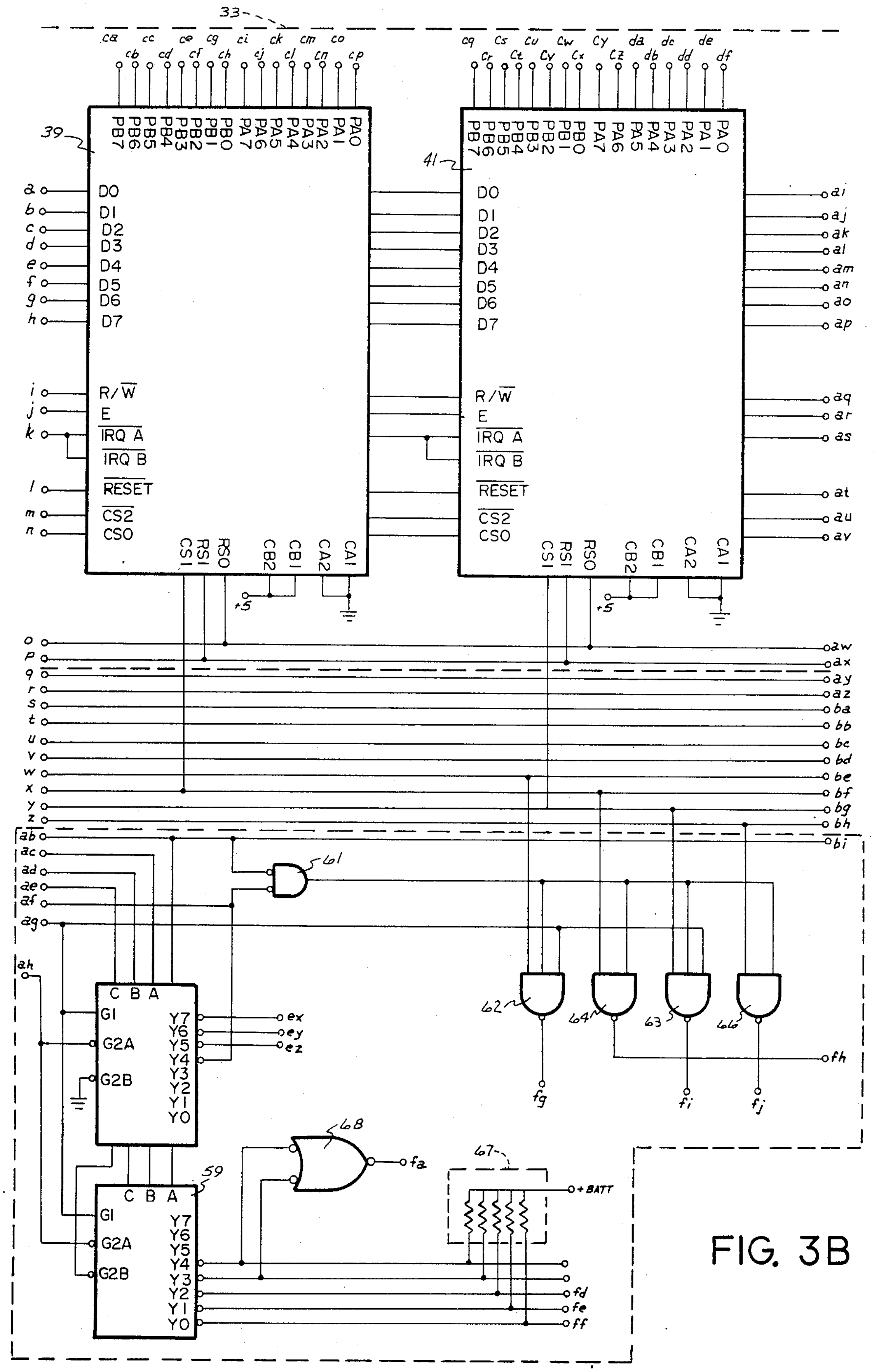
Figure 3C:
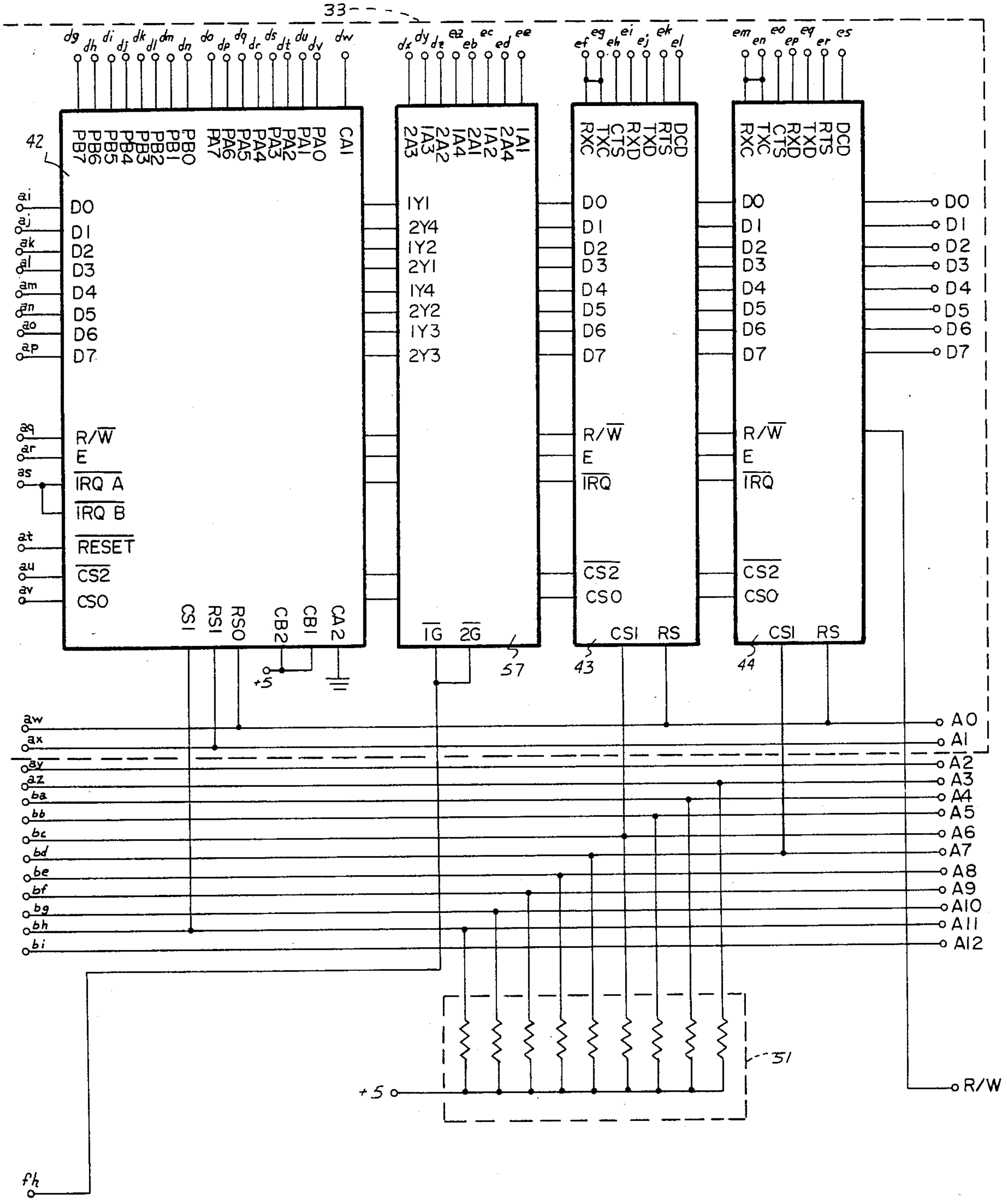

Referring now to FIGS. 3*a–c*, the main processing unit (11) includes generally a microprocessor (32), a peripheral interface unit (33), and an address decoder unit (34).

The microprocessor (32) may be provided by use of a Motorola part No. MC6808P microprocessor. The peripheral interface unit (33) may be comprised of four PIA units (38, 39, 41 and 42) (such as Motorola part No. MC6821P), two ACIA units (43 and 44) (such as Motorola part No. MC6850P), and one input buffer (57) (such as Texas Instruments part No. SN74LS244N).

The eight data ports ($D_0$ through $D_7$) and the R/not W port of the microprocessor (32) each connect through a 22k ohm pull up resistor to a 5 volt source. These resistors may be provided by use of an SIP package such as Bourns part No. 4311R-101-223 (36). Each of the data ports then connects to the peripheral interface unit (33).

The eight data lines that connect to the peripheral interface unit (33) connect specifically to the $D_0$ through $D_7$ data ports of the four PIA units (38, 39, 41 and 42) and two ACIA units (43 and 44), and to the 1Y1, 2Y4, 1Y2, 2Y1, 1Y4, 2Y2, 1Y3 and 2Y3 input ports of the buffer unit (57), respectively.

The R/not W and enable ports for each of the PIA and ACIA units connect to the R/not W and enable ports of the microprocessor (32). The IRQ ports of the above units (there are two IRQ output ports for each of the PIA units and a single IRQ output port for the ACIA units) connect to the IRQ input port of the microprocessor (32) and through a 3k ohm resistor (46) to a positive 5 volt source. The reset port for each of the PIA units connects to the reset input port of the microprocessor (32).

The enable port of the microprocessor (32) also connects to input of a divide-by-three counter (47) (such as a partially utilized Texas Instruments divide-by-twelve counter part No. SN74LS92N). The output of this counter (47) provides a 307.2 kilo hertz signal that may be tied through a 4.7k ohm pull up resistor (48) to a 5 volt source and to a 12-stage counter (228) described below. The enable port of the microprocessor (12) also connects to the address decoder unit (34) as described below.

The $A_0$ through $A_{15}$ address pins of the microprocessor (32) connect to a like number of address lines that comprise an address buss (49). The address line connected to the $A_0$ port of the microprocessor (32) connects to the RSO port of each PIA unit (38, 39, 41 and 42), to the RS port of the two ACIA units (43 and 44) and as otherwise indicated below. The address line connected to the $A_1$ port of the microprocessor (32) connects to the RS1 port of each of the four PIA units (38, 39, 41 and 42) and otherwise as indicated below.

The address lines connected to the $A_8$, $A_9$, $A_{10}$, $A_{11}$, $A_6$ and $A_7$ ports of the microprocessor (32) connect to the CS1 ports of the first PIA unit (38), the second PIA unit (39), the third PIA unit (41), the fourth PIA unit (42), the first ACIA unit (43) and the second ACIA unit (44), respectively.

The address lines associated with the address ports $A_3$ through $A_{11}$ are also connected through separate 22k ohm pull up resistors to a positive 5 volt source. Such resistors may be provided by use of a Bourns part No. 4310R-101-223 SIP package (51).

The CSO port of the four PIA units (38, 39, 41 and 42) and the two ACIA units (43 and 44) connect to the address line associated with the $A_{12}$ address port of the microprocessor (32).

The VMA port of the microprocessor (32) connects to one of two inputs of a dual input NAND gate (52) (such as Texas Instruments part No. SN74LS00N), the remaining input of which connects to a positive 5 volt source. The output of this NAND gate (52) connects to the address decoder unit (34) described below.

the MR and HALT ports of the microprocessor (32) are tied to a positive 5 volt source. The RE port connects directly to ground.

A 3.6864 mega hertz crystal (53) (such as M-Tron part No. MP-1) connects across the EXTAL and XTAL ports of the microprocessor (32). In addition, both of these ports connect through parallel configured 27 pico farad capacitors (54 and 56) to ground.

With continued reference to FIG. 3, the address decoder unit (34) will now be described. The address decoder unit (34) includes two three-to-eight decoders (58 and 59) (such as Texas Instruments part No. SN74LS138N) and a plurality of logic elements. The A, B and C input ports to the decoders (58 and 59) connect to the address lines associated with address ports $A_{12}$ through $A_{15}$ of the microprocessor unit (32). The G1 port of each decoder (58 and 59) connects to the enable output port of the microprocessor (32). The G2A port of both decoders (58 and 59) connects to the output of the NAND gate (52) that connects to the VMA port of the microprocessor (32). The G2B port of one decoder (58) connects to ground. The G2B port of the remaining decoder (59) connects to the address line associated with the address port $A_{15}$ of the microprocessor (32).

The $Y_4$ output port of the first decoder (58) connects to one input of a two input NOR gate (61) (such as Texas Instruments part No. SN74LS02N). This same input to the NOR gate (61) also connects to the CS2 port of all four PIA units (38, 39, 41 and 42) and both ACIA units (43 and 44). The remaining input to the NOR gate (61) connects to the $A_{12}$ address port of the microprocessor (32).

The output of this NOR gate (61) connects to one input each of two three input NAND gates (62 and 63) (such as Texas Instruments part No. SN74LS10N) and of two dual input NAND gates (64 and 66) (such as Texas Instruments part No. SN74LS00N).

With respect to the first three input NAND gate (62), the remaining two inputs connect to the $A_8$ address port of the microprocessor (32) and the E clock port of the microprocessor (32). This NAND gate (62) provides a "RAM cut off" signal to other components described in more detail below.

The second three input NAND gate (63) connects to the $A_{10}$ address port and the E clock port of the microprocessor (32). This NAND gate (63) provides a "write to display" signal to other components described in more detail below.

The first dual input NAND gate (64) has its remaining input connected to the $A_9$ address port of the microprocessor (32). The output of this NAND gate (64) connects to both the not 1G and not 2G ports of the buffer unit (57) described above with respect to the peripheral interface unit (37). The signal from this NAND gate (64) provides the buffer (57) with a "read from 36 switches" signal for appropriate control of other components described below.

Finally, the second dual input NAND gate (66) has its remaining input connected to the $A_{11}$ address port of the microprocessor (32). The output signal of this NAND gate (66) operates to reset a watch-dog circuit described in more detail below.

The $Y_5$ through $Y_7$ output ports of the first decoder (58) connect to the EPROM units (69, 71 and 72) of the memory unit (16) as described below.

The $Y_0$ through $Y_4$ outputs of the second decoder (59) each connect through a 22k ohm pull up resistor to the battery unit (15). These resistors may be provided by use of a Bourns part No. 4306R-101-223 SIP package (67).

The $Y_3$ and $Y_4$ output ports of the second decoder (59) connect to the two inputs of a two input AND gate (68) (such as Texas Instruments part No. SN74LS08N). The output of this AND gate connects to the not G port of a bi-directional buffer (76) described below with respect to the memory unit (16).

The Memory Unit

Figure 4:
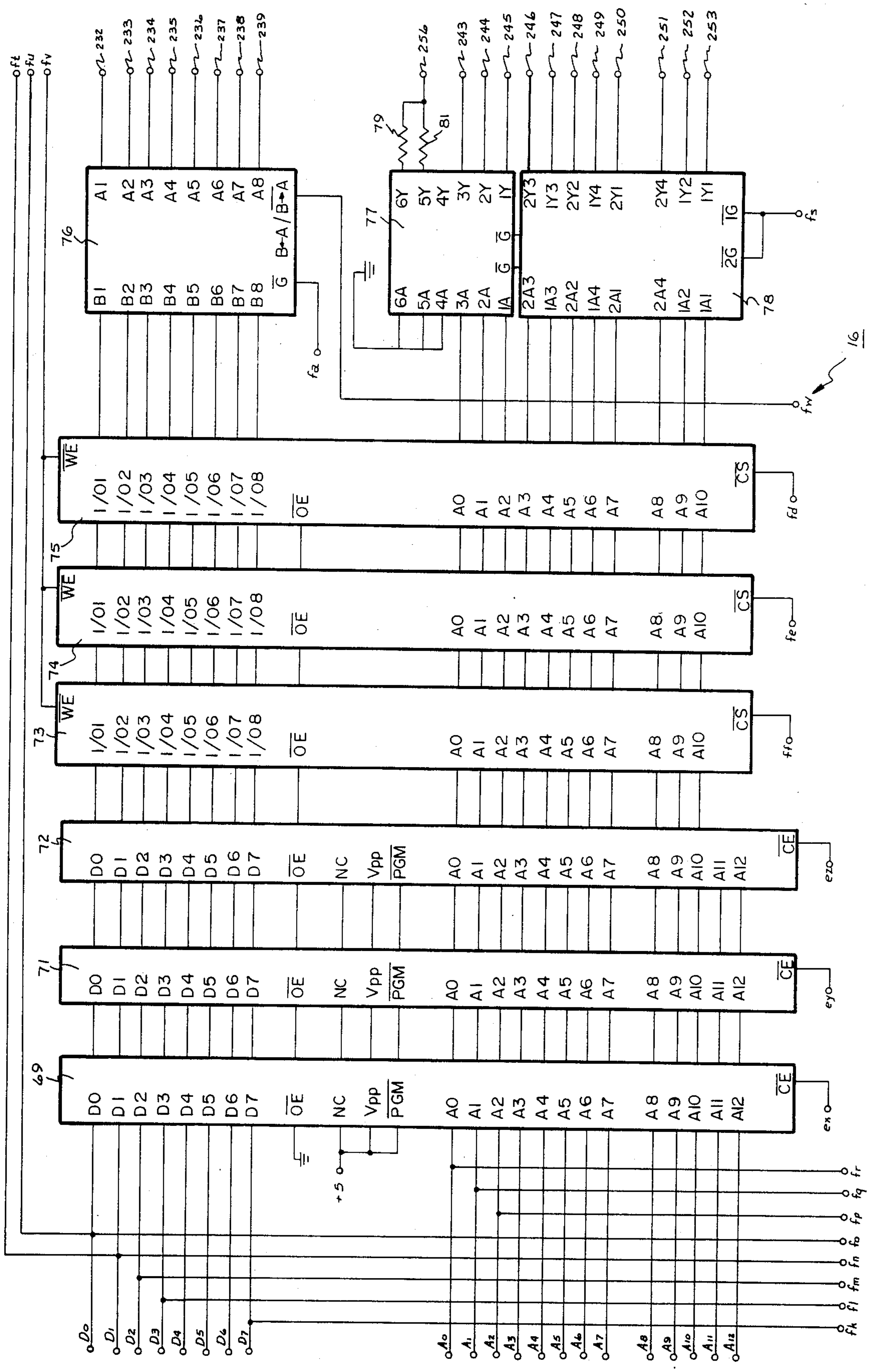
FIG. 4 provides a schematic diagram of the memory unit.

Referring now to FIG. 4, the memory unit (16) includes generally three EPROM units (69, 71 and 72) (such as Intel part No. 2764) and three RAM units (73, 74 and 75) (such as Hitachi part No. HM6116P-4). In addition, three buffer units (76, 77 and 78) (such as Texas Instruments part Nos. SN74LS245N, SN74LS367N and SN74LS244N, respectively) are also provided.

The eight data ports of each EPROM (69, 71 and 72) and RAM (73, 74 and 75) connect to the eight data lines of the microprocessor (32).

The not OE port of each EPRON and RAM unit (69 and 71 through 75) connect to ground. The NC, $V_{PP}$ and not PGM port of all three EPROM units (69, 71 and 72) connect to a positive 5 volt source.

The $A_0$ through $A_{12}$ address ports of each EPROM unit (69, 71 and 72) connect to the $A_0$ through $A_{12}$ address ports of the microprocessor (32), respectively. The $A_0$ through $A_{10}$ address ports of each RAM unit (73, 74 and 75) connect to the $A_0$ through $A_{10}$ address ports of the microprocessor (32).

The not CE port for the first EPROM (69) connects to the $Y_7$ output port of the first decoder (58) of the address decoder unit (34). The not CE port for the second EPROM unit (71) connects to the $Y_6$ port of that same decoder (58). Similarly, the not CE port for the third EPROM (72) connects to the $Y_5$ port of the same decoder (58).

The not CS port of the first RAM unit (73) connects to the $Y_0$ output port of the second decoder (59) of the address decoder unit (34). The not CS port for the second RAM unit (74) connects to the $Y_1$ output port of the same decoder (59). Similarly, the not CS port for the third RAM unit (75) connects to the Y2 output port of the same decoder (59).

With continued reference to FIG. 4, the eight lines of the data buss connect through the bi-directional buffer (76) to a terminal interface suitable for operable interaction with the memory module unit (23) described below. The B←A/not B→A port of this buffer (76) connects to the R/not W port of the microprocessor (32).

The $A_0$ through $A_{10}$ address ports of the microprocessor (32) pass through two unidirectional buffers (77 and 78) such as Texas Instruments part Nos. SN74LS367N and SN74LS244N) to a terminal interface suitable for operable interaction with the memory module unit (23). Unused address inputs to the first buffer (77) may be tied to ground. The 5Y and 6Y outputs of that same buffer (77) may be connected in parallel through discrete 470 ohm resistors (79 and 81) to the terminal interface for the memory module unit (23). This configuration allows for an LED associated with the memory module unit (23) to be illuminated under appropriate circumstances.

The memory module unit (23) terminal interface described above also includes a connection to the $Y_4$ and $Y_3$ output ports of the second decoder (59) of the address decoder unit (34) described above, for appropriate connection to the not 3XXX and not 4XXX ports of the memory module unit (23).

The Individual Apartment and Main Meter Monitoring Units

Referring now to FIG. 5*a*, up to thirty-six separate apartment monitoring units (17) may be provided. Since they are identical, only one will be described in detail.

The furnace for each apartment includes a solenoid for control thereof. Two leads are placed across this solenoid to detect the 24 volt AC signal that indicates that the solenoid, and hence the furnace, has been activated. A transient suppressor (83) (such as General Electric part No. V47ZA1) may be placed in parallel across these leads.

The leads then pass through a filter comprising a 3.3k ohm resistor (84) and a 0.1 micro farad capacitor (86). A diode (87) (such as General Instruments part No. 1N4001) also connects in parallel across the leads. Finally, a series connected LED (88) (such as General Instruments part No. MV5055) and optocoupler (89) (such as General Instruments part No. 4N25) connect in parallel across the leads. The transistor side of the optocoupler (89) serves to transmit the "on" signal from the furnace solenoid to the data input multiplexing unit described below.

Referring to FIGS. 5*b–e*, the main meter monitoring devices (91, 92, 93 and 94) provide for monitoring of gas, electric and water meters. Two monitoring inputs are provided for two discrete gas meters (91 and 92) and one monitoring input is provided for one water meter (94). Since the pulse meters utilized with both gas and water meters are substantially identical, the circuits provided herein for gas and water meters are identical. Therefore, only one of these input circuits will be described.

With reference to FIG. 5*b*, the two leads from the pulse creating meter (not shown) pass through a filter comprised of a 270 ohm resistor (96) and a 0.1 micro farad capacitor (97) and then through a full wave rectifying bridge (98). A 22k ohm resistor (99) connects between the outputs of the bridge (98), as does a 10 micro farad capacitor (101). Also connected across the output of the bridge (98) are a series connected LED (102) (such as General Instrument part No. MV5055) and an optocoupler (103) (such as General Instrument part No. 4N25). The transistor output of the optocoupler (103) then connects to the main meter data input unit described below.

Since electric meters require a somewhat different monitoring method, a different interface is required, as indicated by the numeral 93 (see FIG. 5*d*). Such an electric power provides at least three outputs; a first common output denoted by the character K, and two discrete outputs represented by the characters Y and Z. At any given moment, a switch connects the K line to either the Y line or the Z line. When a certain quantity of electricity has been consumed, the closure will alternate.

The circuit provided monitors such a meter to determine whether closure exists between the K and Y lines, or the K and Z lines. Since the components provided to monitor the Y and K lines are identical to the components provided to monitor the Z and K lines, only the former will be described in detail.

A transient suppressor (104) (such as General Electric part No. V47ZA1) connects between the K and Y lines. A filter comprising a 1.2k ohm resistor (106) and a 0.1 microfarad capacitor (107) also connects therebetween. A diode (108) (such as General Instruments part No. 1N4001) connects in parallel across the K and Y leads. Finally, a series connected LED (109) (such as General Instruments part No. MV5055) and optocoupler (111) (such as General Instruments part No. 4N24) connect in parallel across the two leads. The transistor output of the optocoupler (111) then connects to the main meter data input unit described below.

Figure 5F:
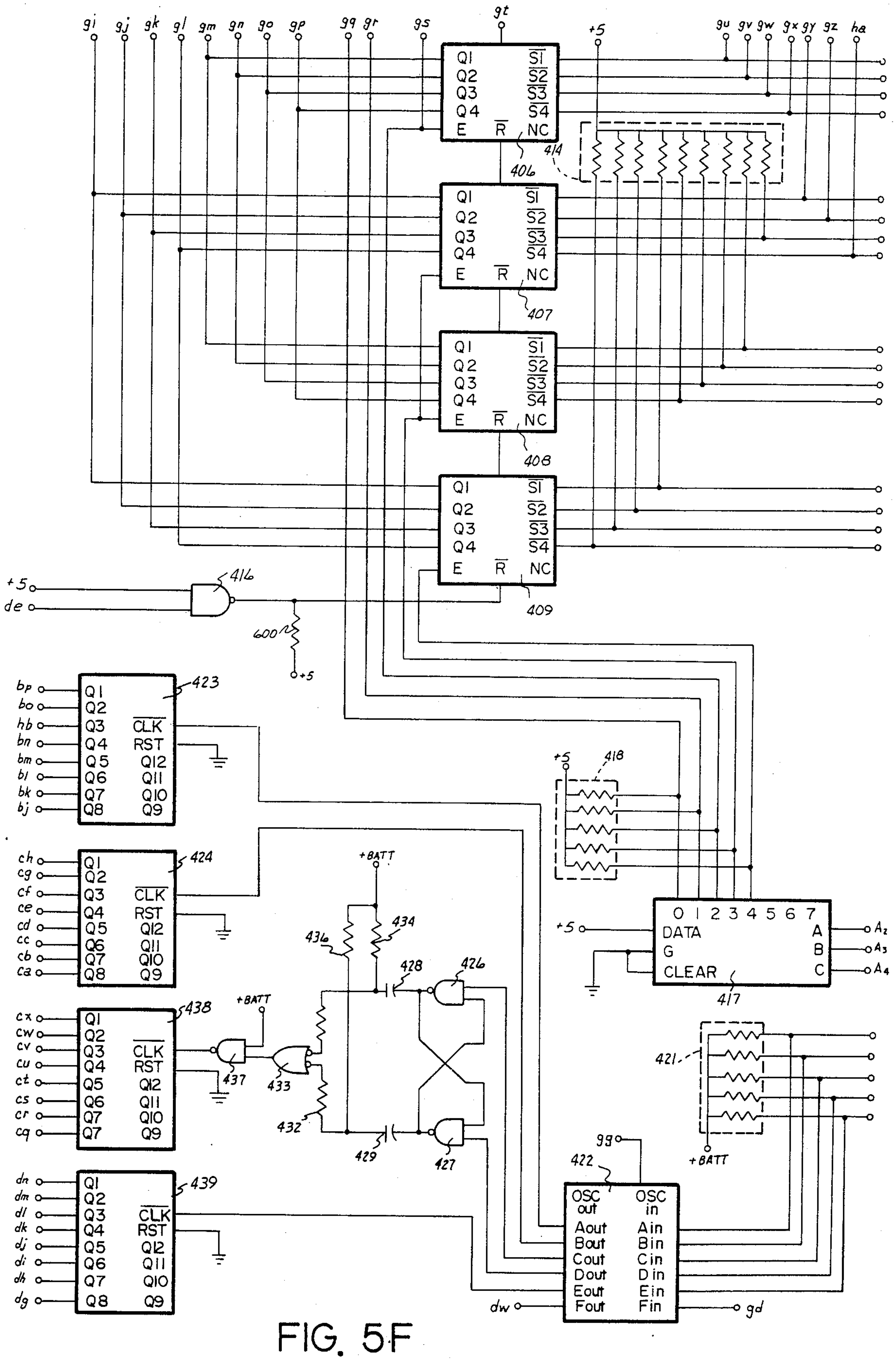
FIGS. 5*f–g* provide schematic diagrams of the input circuitry for the monitoring units.
Figure 5G:
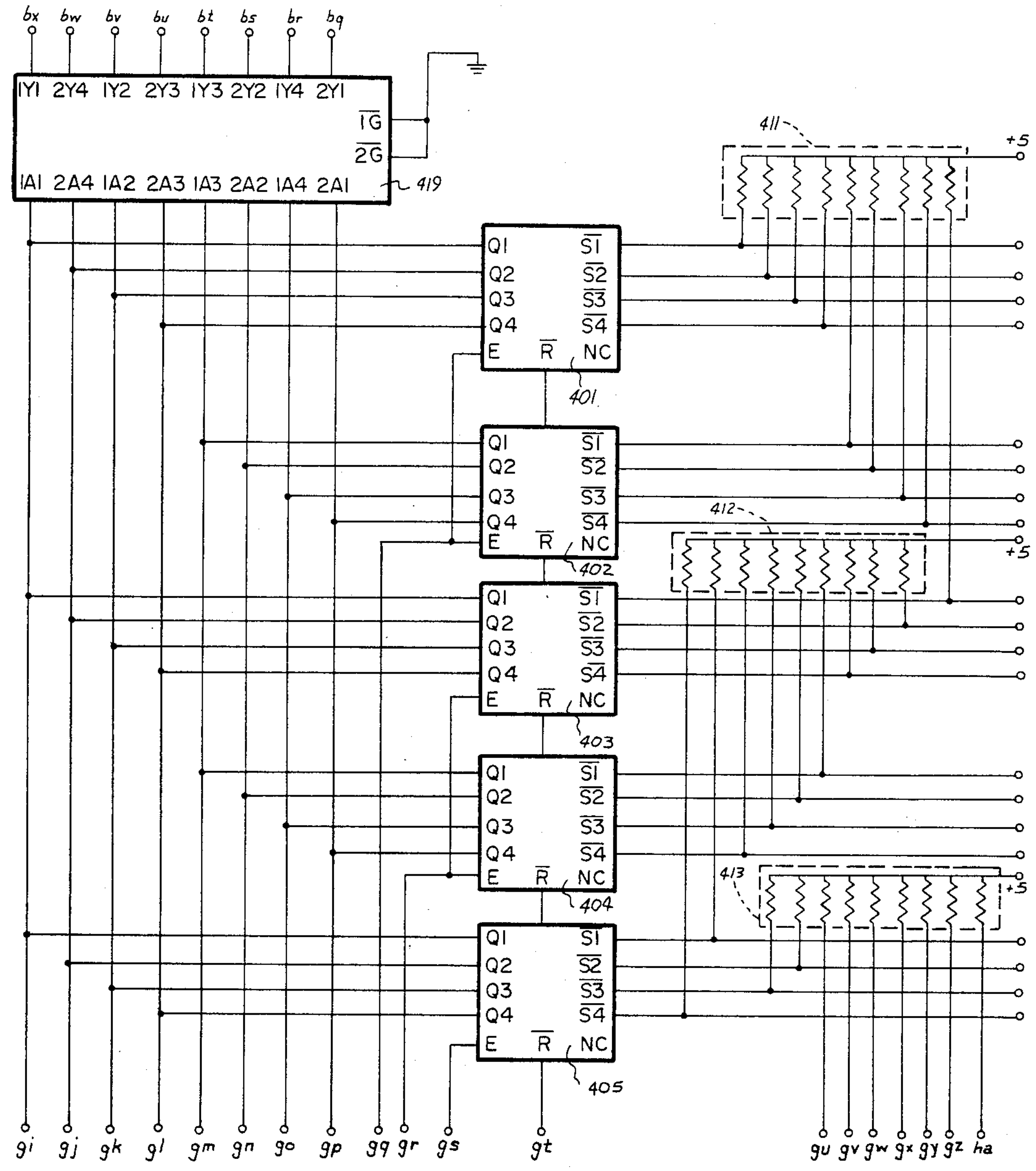

With reference to FIGS. 5*f–g*, the data input multiplexing unit will now be described. The data input multiplexing unit includes nine latches (401 through 409) (such as Motorola part No. MC 14044BCP). The data input line from each of the thirty-six apartment monitoring units (17) described above are each connected through a 3.3k ohm pull up resistor to a positive 5 volt source. These resistors may be provided through use of four Bourns part No. 431OR-101332 SIP packages (411 through 414).

The inputs from the first four apartment monitoring units (17) connect to the S1 through S4 input parts of the first latch (401). Similarly, the fifth through eighth apartment monitoring units connect to the S1 through S4 input ports of the second latch (402). As may be observed from the drawing, the input leads from the apartment monitoring units (17) are connected in groups of four in consecutive order to the latches provided, until the last four apartment monitoring units (17) are connected to the four inputs of the last latch (409).

The reset port for each latch connects to the output of a two input NAND gate (416) (such as Texas Instruments part No. SN74LS00N). The output of the NAND gate (416) also connects through a 4.7k ohm resistor (600) to a positive 5 volt source. One input of this NAND gate (416) connects to a positive 5 volt source, and the remaining input connects to the PA1 port of the third PIA unit (41) of the peripheral interface unit (33).

The enable port of the first two latches (401 and 402) connects to the 0 output port of an eight bit addressable latch (417) (such as Texas Instruments part No.

SN74LS259N). The enable ports for the third and fourth latches (403 and 404) connect to the 1 output port of the eight bit addressable latch (417). Similarly, the enable ports for the fifth and sixth latches (405 and 406), for the seventh and eighth latches (407 and 408) and for the ninth latch (409) connect to the 2, 3 and 4 output ports of the eight bit addressable latch (417). The 0 through 4 output ports of the eight bit addressable latch (417) also connect through 4.7k ohm pull up resistors to a positive 5 volt source. These resistors may be provided through use of a Bourns part No. 4306R101-472 SIP package (418).

The A, B and C input ports of the eight bit addressable latch (417) connect to the $A_2$, $A_3$ and $A_4$ address lines that connect to those address ports of the microprocessor (32). The data port of this latch connects to the positive 5 volt sourcee, and the G and clear ports connect to ground.

The data input multiplexing unit further includes an octal buffer (419) (such as Texas Instruments part No. SN74LS244N). The 1A1, 2A4, 1A2 and 2A3 input ports of this buffer (419) are connected to the Q1 through Q4 outputs of the first latch (401), the third latch (403), the fifth latch (405), the seventh latch (407) and the ninth latch (409). Similarly, the 1A3, 2A2, 1A4 and 2A1 input ports of the buffer (419) connect to the Q1 through Q4 output ports of the second latch (402), the fourth latch (404), the sixth latch (406) and the eighth latch (408).

The not 1G and not 2G ports of the buffer (419) are connected to ground. The 1Y1, 2Y4, 1Y2, 2Y3, 1Y3, 2Y2, 1Y4 and 2Y1 output ports of the buffer (419) are connected to the PA0 through PA7 input ports of the first PIA unit (38) of the peripheral interface unit (33).

The main meter data input unit will now be described. The single input lead from each of the two gas meter monitoring units (91 and 92) and the water meter monitoring unit (94), as well as the two leads from the electric meter monitoring unit (93) each connect through a 1k ohm pull up resistor to the battery unit (15). The resistors may be provided through use of a Bourns part no. 4306R-101-102 SIP package (421).

In addition, the data input lead from the first gas meter monitoring unit (91) connects to the $I_{IN}$ port of a debouncer (422) (such as Motorola part no. MC1449OVP). The input from the second gas meter monitoring unit (92) connects to the $B_{IN}$ port of this debouncer (422). The two leads from the electric meter monitoring unit (93) connect to the $C_{IN}$ and $D_{IN}$ ports of the debouncer (422) and the single input lead from the water meter monitoring unit (94) connects to the $E_{IN}$ port of the debouncer (422). Finally, the $F_{IN}$ port of the debouncer (422) connects to the collector output of a transistor (308) that will be described below in connection with the battery unit (15).

The $A_{OUT}$ port of the debouncer (422) connects to the clock input of a twelve stage counter (423) (such as an Motorola part no. MC14040BCP). The $B_{OUT}$ port of the debouncer (422) similarly connects to a second twelve stage counter (424).

The $C_{OUT}$ and $D_{OUT}$ ports of the debouncer (422) each connect to one input of separate two input NAND gates (426 and 427) (such as MOT part no. MC14011BCP). The remaining input of each NAND gate (426 and 427) connects to the output of the other. Each NAND gate (426 and 427) output then connects through a 0.1 micro farad capacitor (428 and 429) and series connected 4.7k ohm resistor (431 and 432) to the two inputs of a two input NAND gate (433). In addition, two 47k ohm pull up resistors (434 and 436) are connected between the capacitor and resistor connections to the battery unit (15).

The output of the third NAND gate (433) connects to one input of a fourth NAND gate (437). The remaining input to this NAND gate (437) connects to the battery unit (15), and the output connects to the clock input of a third twelve stage counter (438).

The $E_{OUT}$ port of the debouncer (422) connects to the clock input of a fourth twelve stage counter (439). Finally, the $F_{OUT}$ port of the debouncer (422) connects to the CA1 port of the fourth PIA unit (42) of the peripheral interface unit (33).

The reset ports for all four twelve stage counters (423, 424, 438, and 439) are connected to ground.

The Q1 through Q8 output ports of the first twelve stage counter (423) are connected to the PB0 through PB7 input ports of the first PIA unit (38) of the peripheral interface unit (33). The Q1 through Q8 output ports of the second twelve stage counter (424) are connected to the PBO through PB7 input ports of the second PIA unit (39). The Q1 through Q7 output ports of the third twelve stage counter (438) are connected to the PB0 through PB7 input ports of the third PIA unit (41) and the Q1 through Q8 output ports of the fourth twelve stage counter (439) are connected to the PB0 through PB7 input ports of the fourth PIA unit (42).

The Control Switch Unit

Referring to FIG. *6a*, each monitored apartment has associated therewith a single pole double throw switch (such as Alco part no. MSS-1200G). Since this invention (10) is designed to monitor up to thirty-six apartments, thirty-six discrete switches are provided in a vacant/occupied control switch array (112).

The common terminal of each switch in this array (112) connects to the output of a buffer (113) (such as National Semiconductor part no. MM74C906N). These buffers (113) are connected in groups of four such that the inputs of the first four buffers (114) connect to the PA0 port of the fourth PIA unit (42) described above. The inputs to the second group of buffers (116) connect to the PA1 port of the fourth PIA unit (42). Similarly, the third through eighth groups of buffers (117, 118, 119, 121, 122 and 123) connect to the PA2 through PA7 ports of the fourth PIA unit (42). Finally, the last group of four buffers (124) connects to the PA0 port of the third PIA unit (41).

The switches of the vacant/occupied control switch array (112) are connected in four columns (126, 127, 128 and 129). The occupied terminal for each switch in the first column (126) connects to the 1A1 port of the input buffer (57) described above. The vacant terminal for each switch in the first column (126) connects to the 2A4 port of the same buffer (57).

Similarly, the occupied and vacant terminals for the second column of switches (127), the occupied and vacant terminals for the third column of switches (128) and the occupied and vacant terminals for the fourth column of switches (129) connect to the 1A2, 2A1, 1A4, 2A2, 1A3 and 2A3 ports of the input buffer (57), respectively. In addition, all of the lines connected to the occupied and vacant terminals of the switch array (112) are connected through 4.7k ohm pull up resistors to a positive 5 volt source. Such resistors may be provided by use of a Bourns part no. 4310R-101-472 SIP package (131).

Figure 6A:
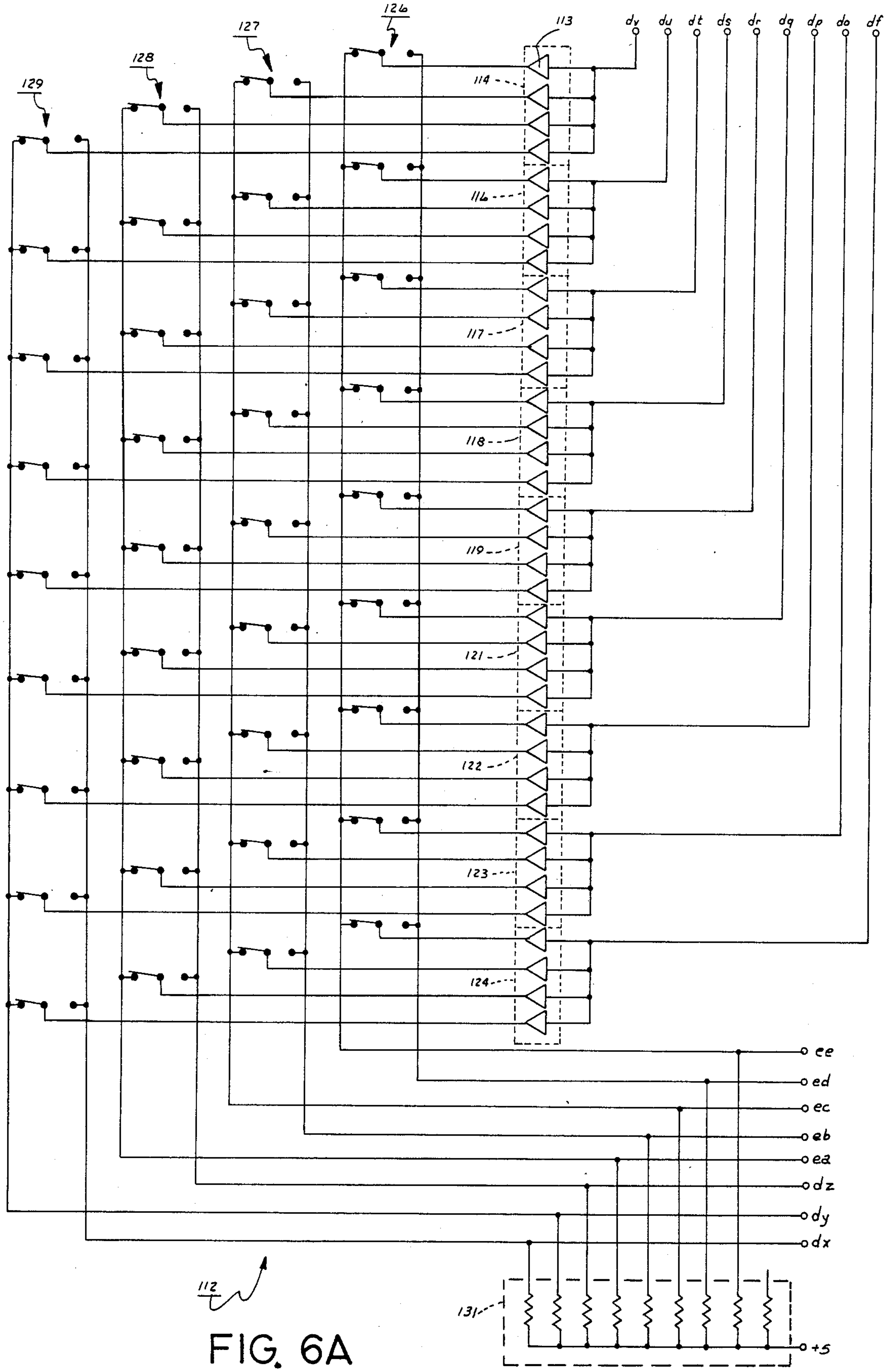
FIGS. 6*a–b* provide schematic diagrams of the control switch unit and a portion of the display unit.
Figure 6B:
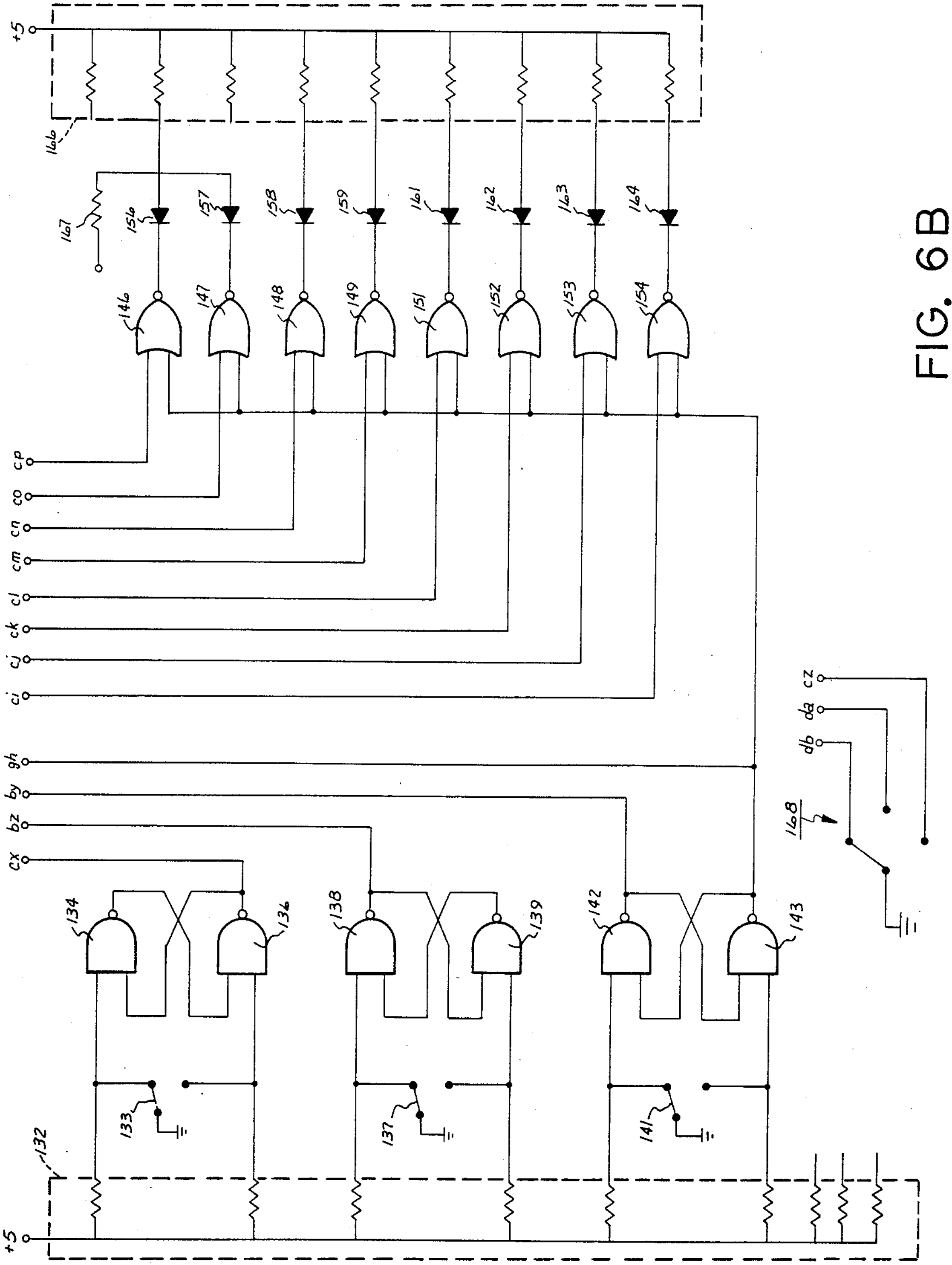

Referring now to FIG. 6*b*, other details of the control switch unit (24) and certain details of the display unit (19) will be described.

A plurality of 5 volt biased 4.7k ohm resistors are provided through use of a Bourns part no. 4310R-101-472 SIP package (132). A "fast advance" switch comprises a single pole double throw push buttom switch (133) that has its common terminal tied to ground and the remaining two terminals connected to two resistors of the SIP package (132). One of the terminals also connects to one input of a dual input NAND gate (134) (such as Texas Instruments part no. SN7400N) and the remaining terminal connects to one input of a second dual input NAND gate (136).

The output of the first NAND gate (134) connects to the remaining input of the second NAND gate (136), and the output of the second NAND gate (136) connects to the remaining input of the first NAND gate (134). The output of the second NAND gate (136) also connects to the PA7 port of the third PIA unit (41) described above.

An "up-date" switch may be provided by use of a similar push button switch (137) that similarly connects to two resistors in the SIP package (132). The "up-date"push buttom switch (137) also connects to a similarly wired pair of NAND gates (138 and 139) (although in this case the NAND gates may be provided by use of Texas Instruments part no. SN74LS00N). The output of the first NAND gate (138) also connects to the CB1 port of the first PIA unit (38).

Finally, a third push button switch (141) comprises a "lamp test" switch. This push button switch (141) also connects to two resistors in the SIP package (132) and to the inputs of a pair of similarly connected NAND gates (142 and 143). The output of the first NAND gate (142) connects to the CB2 port of the first PIA unit (38). The output of the second NAND gate (143) connects to one input of a NOR gate (144) described below. The output of the second NAND gate (143) also connects to one input each of eight two input NOR gates (146 through 149 and 151 through 154).

The remaining input of the first NOR gate (146) connects to the PA0 port of the second PIA unit (39). The remaining input to the second NOR gate (147) connects to the PA1 port of the second PIA unit (39). Similarly, the third through eighth NOR gates (148, 149 and 151 through 154) connect to the PA2 through PA7 ports of the second PIA unit (39).

The output of each NOR gate connects to the cathode side of a discrete light emitting diode (156 through 159 and then 161 through 164). The anode side of each diode then connects through a 220 ohm resistor to a positive 5 volt source. These resistors may be provided by use of a Bourns 4310R-101-221 SIP package (166), with the exception that the resistor (167) associated with the second NOR gate (147) may be a discrete element.

Finally, a "display function" control may be provided by use of a switch (168) having a grounded common terminal and a first terminal connected to the PA4 port of the third PIA unit (41), a second terminal connected to the PA5 port of this same PIA unit (41) and a third and last terminal connected to the PA6 port of the same PIA unit (41).

The Display Unit

Figure 7B:
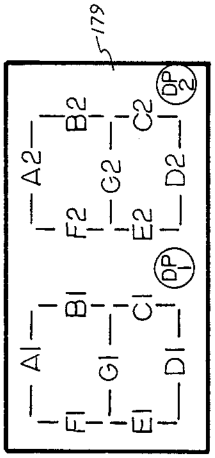
FIGS. 7*a–b* provide schematic diagrams of the display unit.
Figure 7A:
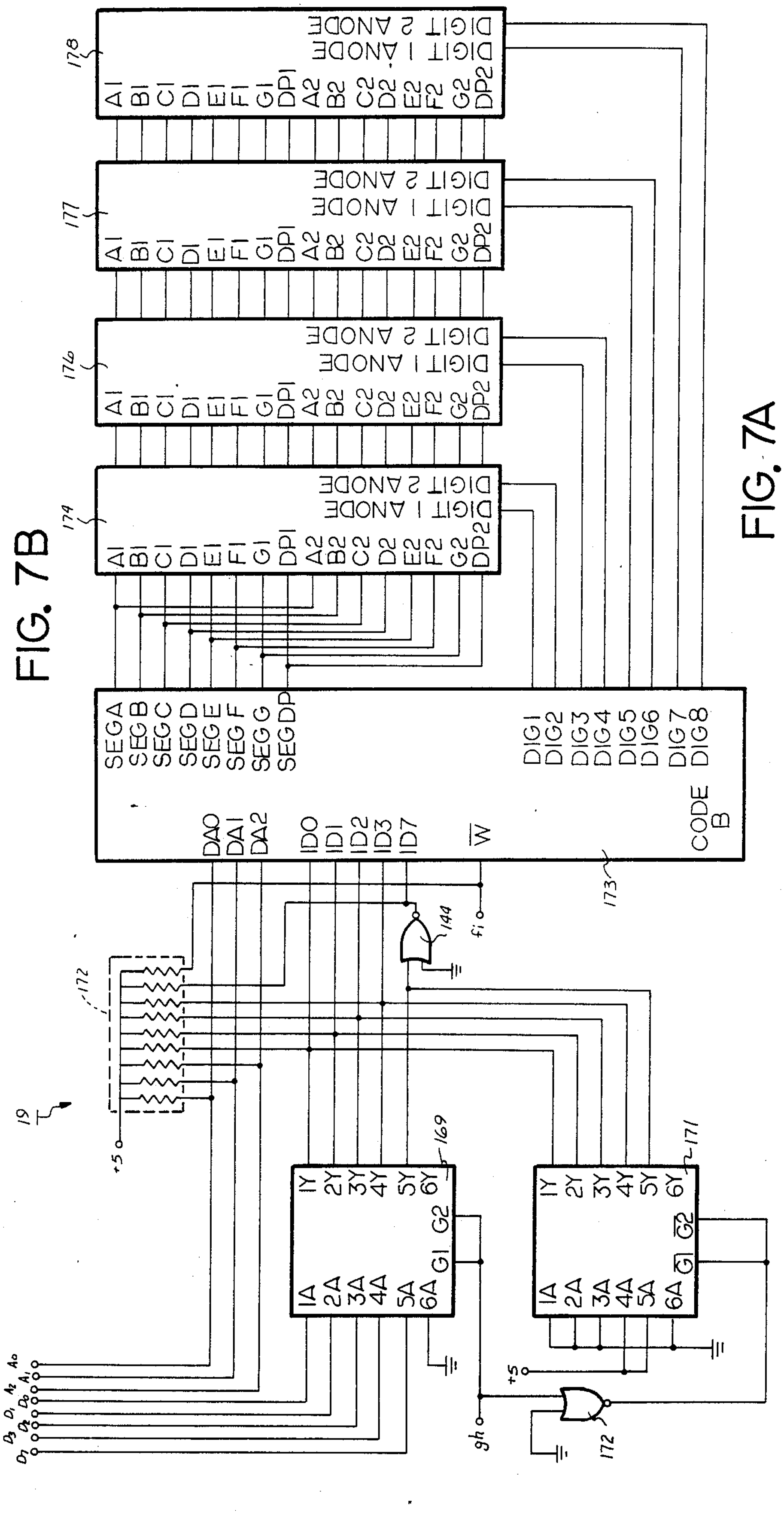

Referring to FIG. 7*a*, the remainder of the display unit (19) includes two buffer units (169 and 171) (such as Texas Instruments part no. SN74LS367N). The 1A through 6A input ports of the first buffer (169) connect to the $D_0$, $D_1$, $D_2$, $D_3$, and $D_7$ data ports of the microprocessor (32) and to ground, respectively. The not G1 and not G2 ports of the first buffer (169) connect to the output of the lamp test NAND gate (143) described above as well as to one input of a two input NOR gate (172) (such as Texas Instruments part no. SN74LS02N). The remaining input of this NOR gate connects to ground. The output of this NOR gate (172) connects to the not G1 and not G2 ports of the second buffer (171).

The 1A, 2A, 3A and 6A input ports of the second buffer (171) are tied to ground. The 4A and 5A input ports of the buffer (171) are connected to a positive 5 volt source. The 1Y through 5Y output ports of the second buffer (171) are connected to the 1Y through 5Y output ports of the second buffer (169). In addition, the 1Y through 4Y outputs of the first buffer (169) each connect through a 4.7k ohm pull up resistor to a positive 5 volt source. These resistors may be provided through use of a Bourns 4310R-101-472 SIP package (172).

The 1Y through 4Y output ports of the first buffer (169) connect to the ID0 through ID3 input ports of an eight digit display driver (173) (such as an Intersil part no. ICM7218CIJI). The 5Y output port of the first buffer (169) connects to one input of a NOR gate (144), the output of which connects to both a 4.7k ohm pull up resistor in the above mentioned SIP package (172), and also to the ID7 input port of the eight digit display driver (173).

The $A_0$ through $A_2$ address lines each connect to a 4.7k ohm pull up resistor in the same SIP package (172) and also to the DA0 through DA2 input ports of the eight digit display driver (173), respectively. The not W port of the eight digit display driver (173) connects to a resistor in the SIP package (172) and also to the output of the "write to display" NAND gate (63) in the address decoder unit (34) described above.

An eight lead buss connects the seven segment and decimal point outputs of the eight digit display driver (173) to the A1 through DP1 and A2 through DP2 input ports of each of four two digit seven segment alpha numeric LED display units (174, 176, 177 and 178). In addition, the DIG1 through DIG8 output ports of the eight digit display driver (173) connect to the digit display control inputs of the four two digit display units (174, 176, 177 and 178).

In FIG. 7*b*, a detail of the display face of one of the two digit seven segment alpha numeric LED display units can be seen as depicted by the numeral 179. By the configuration described above, the display unit (19) of the invention (10) provides eight seven segment alpha numeric displays.

The Modem Unit

Figure 8:
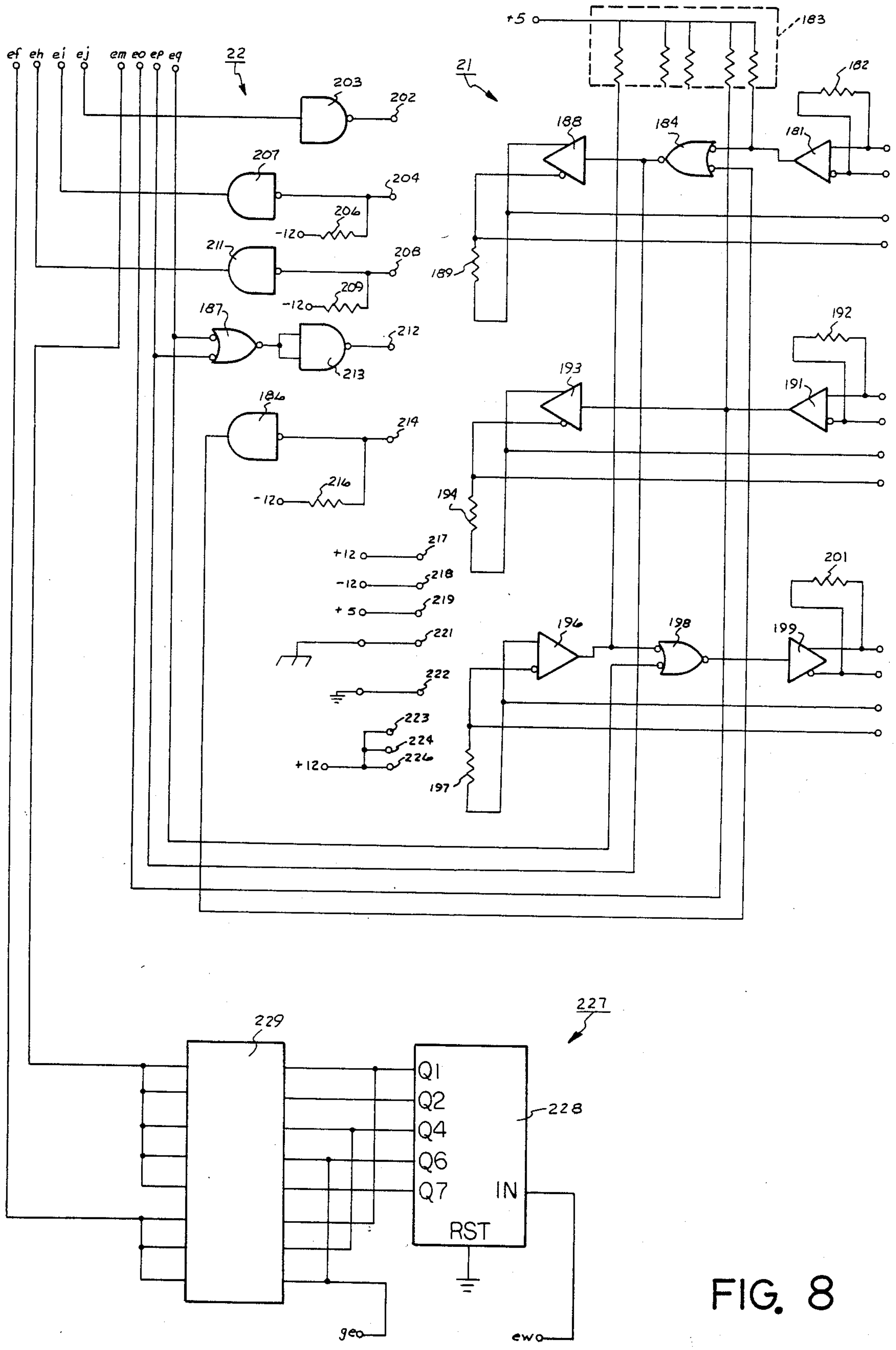
FIG. 8 provides a schematic diagram of the modem and terminal units.

Referring now to FIG. 8, the modem unit (21) includes a first RS-422 receiver (181) (provided here by a Texas Instruments part no. SN75175N). The two input ports of this first receiver (181) provide for a positive RXD in and a negative RXD IN terminal for connection to a modem. In addition, a 100 ohm resistor (182) connects across the two input ports.

The output of the first receiver (181) connects through a 4.7k ohm pull up resistor to a positive 5 volt source (the resistor being provided through use of a Bourns 4306R-101-472 SIP package (183). The output of the first receiver (181) also connects to one input of a two input AND gate (184). The remaining input of this AND gate connects to the output of an RS-232 receiver (186) described with respect to the terminal unit (22) below.

The output of the AND gate (184) connects to the input of another AND gate (187) in the terminal unit (22), to the RXD port of the second ACIA unit (44) in the peripheral interface unit (33), and to the input of an RS-422 driver (188) (such as Texas Instruments part no. SN75174N).

One output port of this driver (188) connects to a positive RXD OUT terminal, and the remaining output port of the driver (188) connects to a negative RXD OUT terminal, for connection to a remote. In addition, a 100 ohm resistor (189) may be connected across the output terminals of the driver (188).

A second RS-422 receiver (191) has one input terminal available to serve as a plus CTS IN terminal and the remaining input available as a negative CTS IN terminal for connection to a modem. In addition, a 100 ohm resistor (192) connects across these input ports. The output of the second receiver (191) connects to a resistor in the SIP package (183), to the CTS port of the second ACIA unit (44) in the peripheral interface unit (33) and to the input of a second RS-422 driver (193).

One output of the second driver (193) connects to an output terminal for appropriate connection to a positive CTS OUT port, and the remaining output terminal may be connected to a negative CTS OUT terminal to facilitate connection to a remote. Also, a 100 ohm resistor (194) may be connected across the output ports of the second driver (193).

A third RS-422 receiver (196) has its two input ports available for connection to the plus TXD IN and negative TXD IN ports of a remote. In addition, a 100 ohm resistor (197) connects across the input ports of the third receiver (196).

The output of the third receiver (196) connects to a resistor in the SIP package (183) and to one input of a two input AND gate (198). The remaining input to this AND gate (198) connects to the remaining input of another AND gate (187) described below with respect to the terminal unit (22). The output of this AND gate (198) connects to the input of a third RS-422 driver (199). One output of this driver (199) provides a plus TXD OUT connection, and the remaining output port provides a negative TXD OUT port for connection to a modem. In addition, a 100 ohm resistor (201) connects across the output ports of the third driver (199).

The Terminal Unit

With continued reference to FIG. 8, a first terminal port (202) of the terminal unit (22) connects to the output port of an RS-232 driver (203) (such as Texas Instruments part no. SN75188N). The input to this driver (203) connects to the TXD port of the first ACIA unit (43) of the peripheral interface unit (33).

The second terminal (204) connects through a 22k ohm resistor (206) to a negative 12 volt source, and also to the input port of an RS-232 receiver (207) (such as Texas Instruments part no. SN75189N). The output of this receiver (207) connects to the RXD port of the ACIA unit (43) of the peripheral interface unit (33). The third terminal (208) connects through a 22k ohm resistor (209) to a negative 12 volt source, and also to the input port of a second RS-232 receiver (211). The output port of this second receiver (211) connects to the CTS port of the first ACIA unit (43).

The fourth terminal (212) connects to the output port of an RS-232 driver (213). Both inputs of this driver (213) connect to the output port of an AND gate (187) that connects to the modem unit (21) as described above. In addition, one input port of the AND gate (187) connects to the TXD port of the second ACIA unit (44), and the remaining input connects to the RXD port of the second ACIA unit (44) of the peripheral interface unit (33). The fifth terminal (214) connects through a 22k ohm resistor (216) to a negative 12 volt source, and also to the input of an RS-232 receiver (186), the output of which connects to the modem unit (21) as described above.

The sixth terminal (217) connects to a positive 12 volt source. The seventh terminal (218) connects to a negative 12 volt source. The eighth terminal (219) connects to a positive 5 volt signal.

The ninth terminal (221) connects to an earth ground. The tenth terminal (222) connects to the circuit ground. Finally, the eleventh, twelvth, and thirteenth terminals (223, 224, and 226) connect to a positive 12 volt source.

To control the baud rates for the modem unit (21) and the terminal unit (22), a baud rate unit (227) is provided. The baud rate unit (227) includes a twelve stage counter (228) (such as Motorola part no. MC14040BCP). The input port to the counter (228) obtains a 307.2 kilo hertz signal by connection to the QC output port of the divide-by-three counter (47) described above. The RST port of the twelve stage counter (228) connects to ground. The Q1, Q2, Q4, Q6 and Q7 output ports of the counter (228) connect to corresponding input terminals of an eight position programmable DIP shunt (229) (such as AMP part no. 435704-8). These five lines are then connected in common on the opposite side of the shunt (229) and are connected to the RXC port of the second ACIA unit (44) of the peripheral interface unit (33) to provide the modem baud rate.

In addition, the Q1, Q4 and Q6 output ports of the counter (228) connect to the three remaining input terminals of the shunt (229). On the opposite side of the shunt (229), these three lines connect in common and then connect to the RXC port of the first ACIA unit (43) of the peripheral interface unit (33) to provide the terminal unit baud rate. Finally, the Q6 counter terminal also connects to the input port of a twelve stage counter (231) (described below).

The Memory Module Unit

Figure 9:
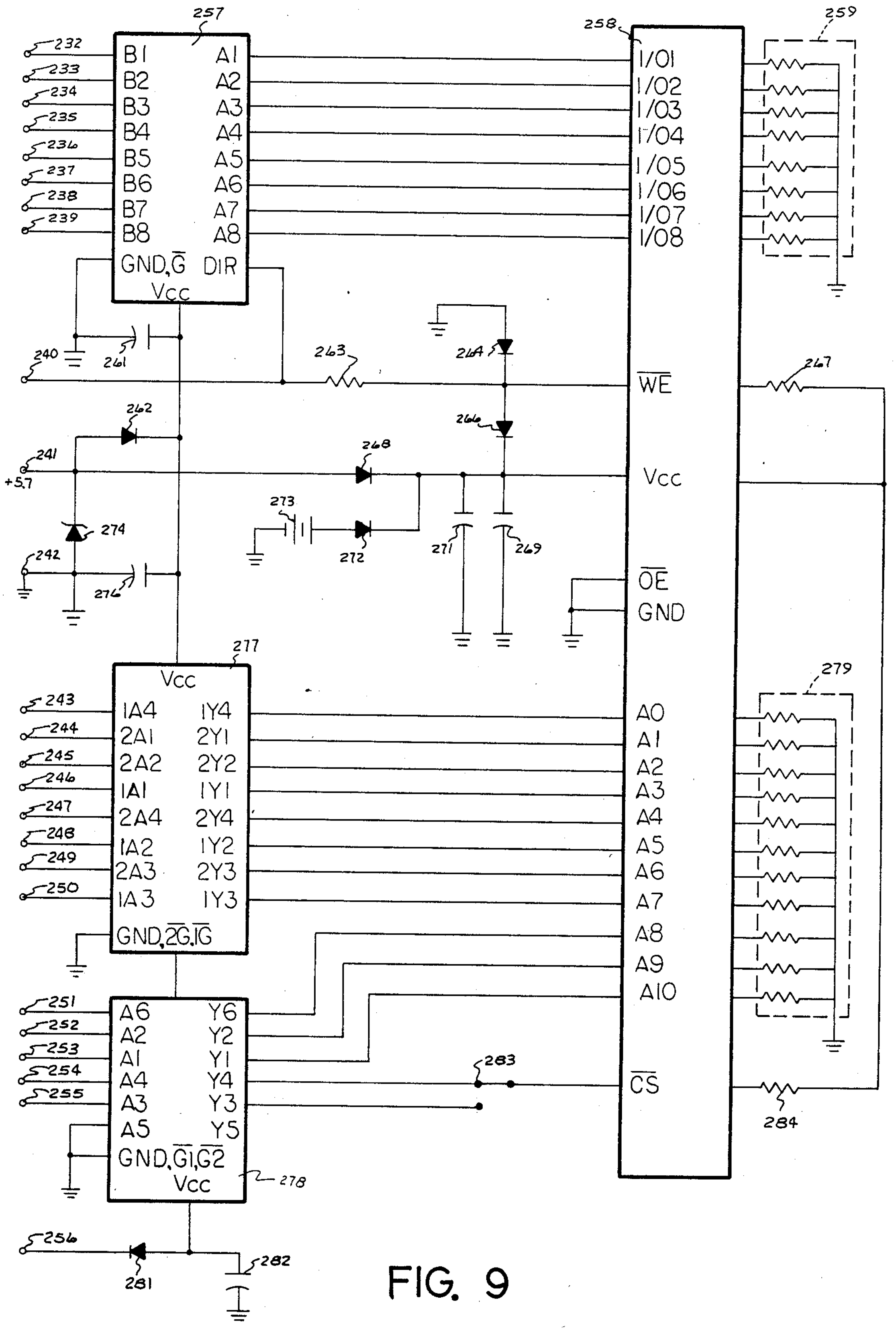

Referring now to FIG. 9, twenty-five input terminals (232 through 256) are provided for the memory module unit (23). The first eight terminals (232 through 239) are provided for connection to the $D_0$ through $D_7$ data ports of the microprocessor (32). These eight terminals (232 through 239) connect to the B1 through B8 ports of a bi-directional buffer (257). The $A_1$ through $A_8$ ports of this buffer (257) connect to the I/01 through I/08 input/output ports of a CMOS RAM unit (258). The eight data lines finally connect through 22k ohm resistors to ground, the resistors being provided by a Bourns 4310R-101-223 SIP package (259).

The ground terminal of the bi-directional buffer (257) connects to ground. The $V_{CC}$ port of the buffer (257) connects through a 0.1 micro farad capacitor (261) to ground and through a forward biased diode (262) (such as a 1N4001) to the tenth terminal (241).

The ninth terminal (240) connects to the DIR port of the buffer (257) and through a 2.7k ohm resistor (263) to the not WE port of the RAM (258). The not WE port also connects to the cathode side of a grounded diode (264) as well as to the anode side of another diode (266) that connects to the $V_{CC}$ port of the RAM (258). The junction between the two diodes (264 and 266) also connects through a 22k ohm resistor (267) to the $V_{CC}$ port of the RAM (258).

The tenth terminal (241) provides for a connection to a positive 5.7 volt source. This terminal (241) also connects through a forward biased diode (268) to the $V_{CC}$ port of the RAM (258). The $V_{CC}$ port also connects to ground through a parallel connected 0.1 micro farad capacitor (269) and a 10 micro farad capacitor (271). In addition, the $V_{CC}$ port of the RAM (258) connects to the cathode side of a diode (272), the anode side of which connects to the positive terminal of a 3 volt lithium battery (273). The remaining terminal of this battery (273) connects to ground.

A 6.2 volt zener diode (274) connects between the tenth and eleventh terminals (241 and 242). The eleventh terminal (242) provides for a connection to ground. The eleventh terminal (242) also connects through a 0.1 micro farad capacitor (276) to the $V_{CC}$ ports of both the buffer unit (257) mentioned above, and the $V_{CC}$ ports of second and third buffer units (277 and 278) that are now described.

The twelvth through nineteenth terminals (243 through 250) serve to connect the $A_0$ through $A_7$ address ports of the microprocessor (32) to the 1A4, 2A1, 2A2, 1A1, 2A4, 1A2, 2A3 and 1A3 terminals of the second buffer unit (277), respectively. The ground terminals, not 2G and not 1G ports of this buffer (277) connect to ground. The 1Y4, 2Y1, 2Y2, 1Y1, 2Y4, 1Y2, 2Y3 and 1Y3 output ports of this buffer (277) connect to the $A_0$ through $A_7$ address ports of the RAM (258) and then through 22k ohm resistors to ground. These resistors may be provided by use of a SIP package (279).

The twentieth through twenty-fourth terminals (251 through 255) provide for connecting the A8 through A10 and 3XXX and 4XXX terminals to the A6, A2, A1, A4, and A3 ports of the third buffer (278). The A5, ground, and not G1 and not G2 ports of this buffer (278) connect to ground. The twenty-fifth terminal (256) provides for connecting an LED signal to a light emitting diode (281), the anode side of which connects to the $V_{CC}$ port of the third buffer (278) and then through a 0.1 micro farad capacitor (282) to ground.

The Y6, Y2 and Y1 ports of the third buffer (278) connect to the A8 through A10 address ports of the RAM (258). The Y4 port of the third buffer (278) and Y3 port connect to separate terminals of a switch (283). The common terminal of this switch (283) connects to the not CS port of the RAM (258) and then through a 22k ohm resistor (284) to the $V_{CC}$ port of the RAM (258). Finally, the not 0E and ground ports of the RAM connect to ground.

The Battery Unit

Figure 10:
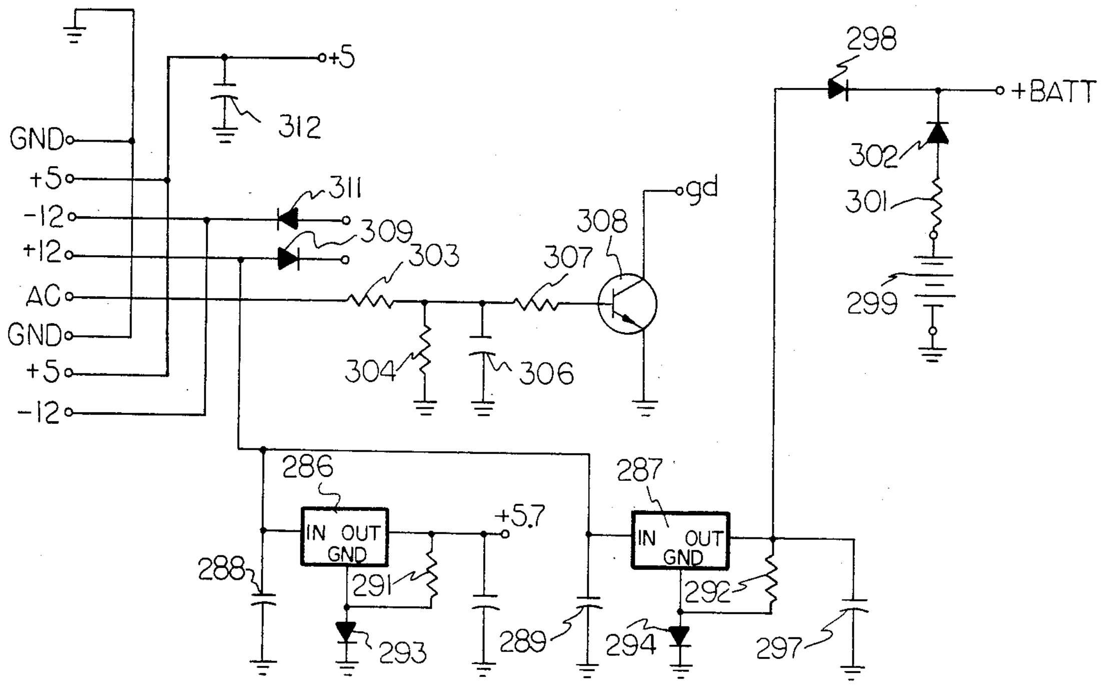
FIG. 10 provides a schematic diagram of the battery unit.

With reference to FIG. 10, the battery unit (15) includes two 5 volt regulators (286 and 287) (such as National Semiconductor LM341P-5.0TB). The input port of each regulator (286 and 287) connects through a discrete 2.2 micro farad capacitor (288 and 289) to ground, and also to a positive 12 volt source. 1k ohm resistors (291 and 292) connect the output of each regulator (286 and 287) to the ground ports thereof. The ground port of each regulator (286 and 287) also connects through separate diodes (293 and 294) to ground. The output of the first regulator (286) connects through a 2.2 micro farad capacitor (296) to ground, and from there the 5.7 volt output of the regulator (286) may be made available to the memory module unit (21).

The output of the second regulator (287) connects through a 2.2 micro farad capacitor (297) to ground, and also through a forward biased diode (298) to an output for use by various CMOS loads throughout the invention (10). A 3.6 volt lithium battery (299) connects between ground and a 27 ohm resistor (301) to a forward biased diode (302) to this same output point.

With continued reference to FIG. 10, the AC signal from the power supply (12) passes through a 4.7k ohm resistor (303) to a parallel grounded 470 ohm resistor (304) and 0.1 micro farad capacitor (306), and from there through a 2.2k ohm resistor (307) to the base of a transistor (308) (such as a 2N3904). The emitter of this transistor (308) connects to ground, and the collector thereof connects to the $F_{IN}$ input of the debouncer (422) described above.

Another terminal connects to a positive 12 volt source in the power supply (12) and passes through a forward biased diode (309) to provide a positive 12 volt source to the remainder of the circuitry. Similarly, the negative 12 volt source in the power supply unit (12) passes through a reverse biased diode (311) to provide a negative 12 volt source to the remainder of the apparatus. Finally, the positive 5 volt source supplied by the power supply unit (12) passes by a 10 micro farad grounded capacitor (312) to provide a positive 5 volt source to the apparatus where required.

The Power Failure Protection Unit

Figure 11A:
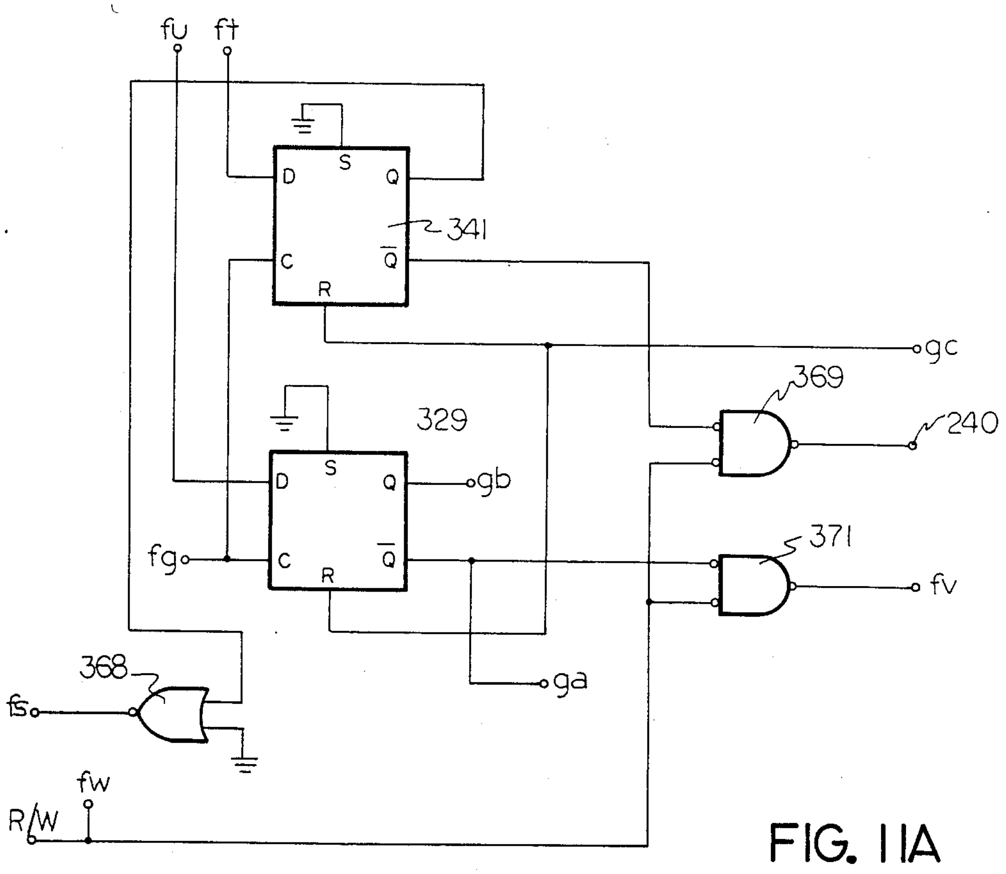
FIGS. 11*a–b* provide schematic diagrams of the power failure protection unit.
Figure 11B:
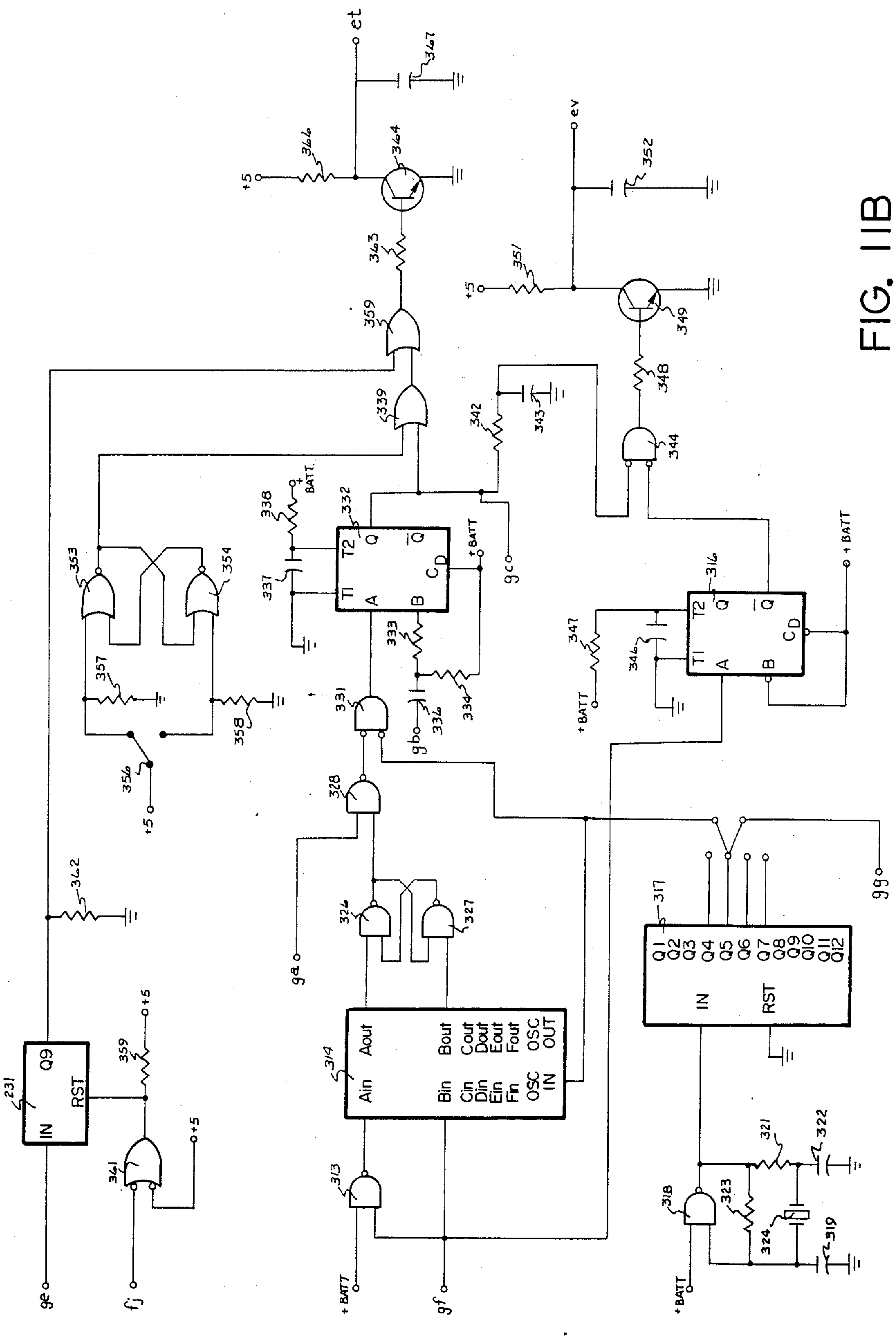

Referring now to FIGS. 11*a–b*, the battery unit (15) connects to one input of a two input NAND gate (313) (such as Motorola part no. MC14011 BCP). The remaining input to this NAND gate (313) connects to the fail port of the power failure module (29) described above, which fail port also connects to the $B_{IN}$ port of a hex contact debouncer (314) (such as Motorola part no. MC14490VP) and to the A input of a dual precision one shot (316) described below.

The output of the NAND gate (313) connects to the $A_{IN}$ port of the debouncer (314). The $OSC_{IN}$ port of the debouncer (314) connects to the Q5 1,024 hertz output of a twelve stage counter (317) (such as Motorola part no. MC14040BCP).

The RST port of this counter (317) connects to ground. The IN port of this counter (317) connects to the output of another NAND gate (318), one input of which connects to the battery unit (15) and the remaining input of which connects through a 20 pico farad capacitor (319) to ground.

The output of this NAND gate (318) also connects through a serial connected 47k ohm resistor (321) and 80 pico farad capacitor (322) to ground. A 10 mega ohm feed back resistor (323) connects between the input of the NAND gate (318) which is also connected to the previously mentioned 20 picofarad capacitor (319), and the output of the NAND gate (318). A 32.768 kilo hertz crystal connects between that same input to the NAND gate (318) to between the 47k ohm resistor (321) and the 80 pico farad capacitor (322). The Q5 output of the counter (317) also connects to the $OSC_{IN}$ port of the hex contact debouncer (314).

Referring back to the debouncer (314), the $A_{OUT}$ port thereof connects to one input of a first NAND gate (326) and the $B_{OUT}$ port connects to one input of a second NAND gate (327). The output of the first NAND gate (326) connects to the remaining input of the second NAND gate (327). Similarly, the output of the second NAND gate (327) connects to the remaining input of the first NAND gate (326).

The output of the first NAND gate (326) connects to one input of another NAND gate (328), the remaining input of which connects to the not Q output of a RAM cutoff flip flop (329) (such as Motorola part no. MC14013BCP).

The output of this NAND gate (328) connects to one input of a two input NOR gate (331) (such as Motorola part no. MC14001BCP). The remaining input to this NOR gate (331) connects to the Q5 output port of the counter (317) described above. The output of this NOR gate (331) connects to the A port of a CMOS dual precision one shot (332) (such as Motorola part no. MC14538BCP). The B port connects to a 4.7k ohm resistor (333), and from there through a 47k ohm resistor (334) to the $C_D$ port of the one shot (332) and also through a 0.1 micro farad capacitor (336) to the Q output of the RAM cutoff flip flop (329). The $C_D$ port of the one-shot (332) is also connected to the battery unit (15).

The T1 port of the one shot (332) connects to ground and also through a 10 micro farad capacitor (337) to the T2 port thereof. The T2 port also connects through a 100k ohm resistor (338) to the battery unit (15). Finally, the Q output of the one shot (332) connects to one input of a two input OR gate (339) (such as Motorola part no. MC14071BCP), to the rest port of a second RAM cutoff flip flop (341) and through a 390k ohm resistor (342) and 0.0039 micro farad capacitor (343) time-delay network to one input of a two input NOR gate (344).

The remaining input to this NOR gate (344) connects to the not Q output of the one shot noted above (316). The B and $C_D$ ports of this one shot (316) are connected to the battery unit (15). The T1 port connects to ground, and to the T2 port through a 0.1 micro farad capacitor (346). Finally, the T2 port connects through a 100k ohm resistor (347) to the battery unit (15).

The NOR gate (344) then connects through a 680k ohm resistor (348) to the base of a transistor (349) (such as an MPS-A14). The emitter of this transistor connects to ground, and the collector connects through a 3k ohm pull up resistor (351) to a positive 5 volt source, and past a grounded 0.01 micro farad filtering capacitor (352) to the not NMI port of the microprocessor (32).

As noted above, the second one shot (332) connects to one input of a OR gate (339). The remaining input to this OR gate (339) connects to the output of a first NOR gate (353). The output of this NOR gate (353) also connects to the input of another NOR gate (354), the output of which connects to the input of the first NOR gate (353). The remaining inputs of both NOR gates (353 and 354) are connected to opposing terminals of a push button switch (356). The common terminal of this switch (356) connects to a positive 5 volt source. This switch (356) provides a reset signal.

In addition, the input to the first NOR gate (353) connects through a 47k ohm resistor (357) to ground, and the switch connected input to the second NOR gate (354) connects through a 4.7k ohm register (358) to ground.

The output of the OR gate (339) connects to one input of another OR gate (359). The remaining input of this OR gate (359) connects to the Q9 output of a twelve stage counter (231). The input of this counter (231) connects to a twelve stage counter (228) as described above. The RST port of this counter (231) connects through a 4.7k ohm pull up resistor (359) to a positive 5 volt source, and to the output of a two input NAND gate (361).

One input of this NAND gate (361) connects to a positive 5 volt source and the remaining input connects to the output of the watchdog reset NAND gate (66) described above with respect to the address decoder unit (34). The Q9 output of the counter (231) also connects through a 47k ohm register (362) to ground.

The OR gate (359) last noted above then connects through a 680k ohm resistor (363) to the base of a transistor (364) (such as an MPS-A14). The emitter of this transistor (364) connects to ground and the collector connects through a 3k ohm resistor (366) to a positive 5 volt source and past a 0.1 micro farad filter capacitor (367) to the reset port of the microprocessor (32).

With continued reference to FIGS. 11*a-b*, first and second RAM cutoff flip flops (341 and 329) are provided as described above. The D port of the first flip flop (341) connects to the $D_1$ data port of the microprocessor (32). The D port of the second flip flop (329) connects to the $D_0$ data port of the microprocessor (32). The C ports of both flip flops (341 and 329) are connected to the RAM cutoff NAND gate (62) described above with respect to the address decoder unit (34). The S ports of both flip flops (341 and 329) are connected to ground. The reset ports of both flip flops (341 and 329) are connected to the Q output of the first one shot (332) as described above.

The Q port of the first flip flop (341) connects to one input of a two input NOR gate (368), the remaining input of which connects to ground. The output of this NOR gate (368) connects to the not 2G and not 1G ports of a buffer unit (78) described above with respect to the memory unit (16). The Q port of the second flip flop (329) connects through a capacitor (336) and a resistor (333) to the B port of the first one shot (332) described above.

The not Q port of the first flip flop (341) connects to one input of a two input OR gate (369). The not Q port of the second flip flop (329) connects to one input of a second OR gate (371). The remaining input of both OR gates (369 and 371) connect to the R/not W port of the microprocessor (32). The output of the first OR gate (369) connects to the ninth terminal (240) as relates to the memory module unit (23). The output of the second OR gate (371) connects to the not WE port of the three RAM units (73 through 75) of the memory unit (16).

The above comprises a detailed description of the hardware configuration of the invention. A software program for placement in the EPROM units (69, 71 and 72) of the memory unit (16) to implement the invention (10) has been put forth in the microfiche appendix that accompanies this disclosure.

Operation of the Invention

Figure 12:
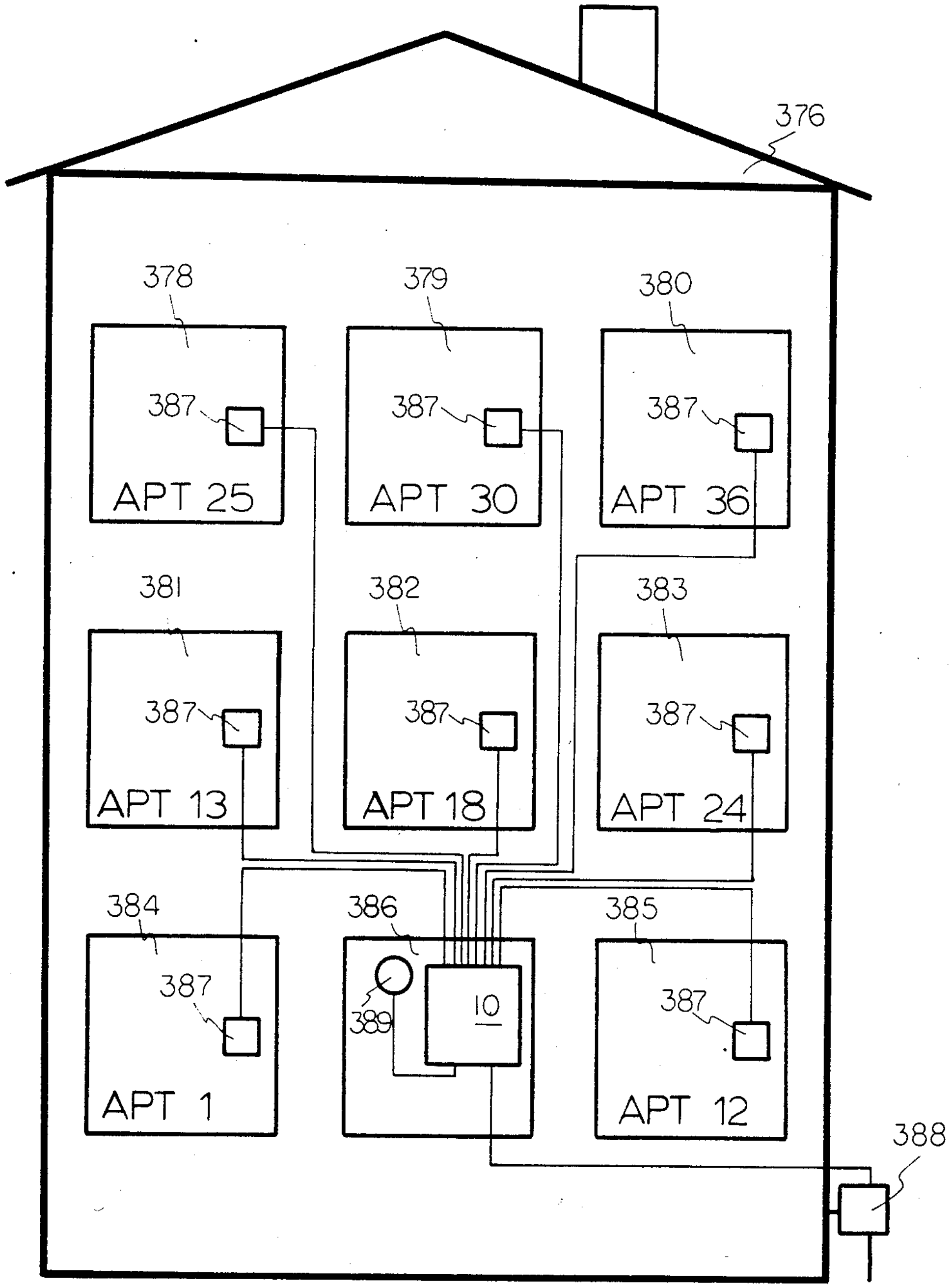
FIG. 12 provides a block diagram of the apparatus installed in an apartment complex.

Referring now to FIG. 12, an illustrative installation of the invention (10) in an apartment setting will be described.

As depicted, the apartment complex (376) includes eight monitored apartment units (378 through 385) as well as a utility area (386). Each apartment has a furnace (387). Also, the apartment complex (376) has one main gas meter (388).

Connections are made between the solenoid of each furnace (387) and one apartment monitoring unit (17) per apartment. AC power from an AC source (389)

empowers the invention (10) during normal usage. The invention (10) then operates to monitor both on-time for all furnaces (387) as well as total gas consumed as measured by the gas meter (388). By use of this information, the amount of gas consumed by each apartment may be calculated and a bill prepared with this information.

While the EPROM units (69, 71 and 72) retain the program that operates the invention (10), the three RAM units (73 through 75) of the memory unit (16) serve to temporarily retain information regarding rate structure, main meter consumption and individual apartment furnace on-time, as well as other pertinent data utilized by the microprocessor (32).

During normal operation, the microprocessor (32) constantly reviews each apartment monitoring unit (17). The latches (401 through 409) provided for each monitoring unit 17 serve to latch an "on" signal. The eight bit addressable latch (417) enables the output ports of a pair of these latches at a time in conjunction with instructions received from the microprocessor (32). The data from each pair of latches may then be transferred through the buffer (419) provided and through the peripheral interface unit (33) to the microprocessor (32).

Through this configuration, each latch will be reviewed every one/sixtieth of a second. Upon each review, the latch will be cleared. When the furnace is shut off, no signal will apear at the input of the latch. By clearing and rechecking each latch this often, the invention obtains high accuracy. Also, the effects of noise and transient signals that might otherwise influence the accuracy of the invention (10) are minimized.

The main meter monitoring unit (18) operates to count pulses from the individual gas, electric and water meters that are being monitored. These signals are buffered and counted in the twelve stage counters (423, 424, 438 and 439) provided. These counters are then directly connected to the peripheral interface unit (33), where this data may be read and utilized by the microprocessor (32).

The devices utilized to store the main meter pulse counts are CMOS based and are further provided with battery power backup in the event of an AC power failure. The significance of this will be made more clear below.

As described above, the display unit (19) includes eight two digit seven segment alpha numeric LED displays (174, 176, 177 and 178) and a plurality of LED signal lights (156 through 159 and 161 through 164).

In a typical arrangement, the two most significant digits of the alpha display are utilized to display a code. This code may be utilized by the observer to understand the information being displayed on the remaining six alpha numeric displays. For instance, the apartment number for which information is then being displayed might be indicated by code or the like. Also, the alpha numeric display may be utilized to signal other events of importance. For instance, when the watchdog circuit fails to reset the watchdog counter, and the counter counts out, this constitutes an indication of a system malfunction, and the signal "HELP 0.4" will be displayed.

With respect to the LEDs, they operate to provide indicia to the operator as to which function is currently being served by manipulation of the display selector switch, and also whether or not an AC or DC failure has occurred in the system.

The vacant/occupied switches (FIG. 6) are provided to allow an operator to instruct the invention (10) as to whether a particular monitored apartment should be billed to an occupant or to the landlord. In the position indicated in FIG. *6a*, all of the switches are in the occupied position. Moving any switch to close the opposing contact will provide a vacancy indication. When this occurs, the furnace for that apartment will continue to be monitored, but no individual bill will be prepared, and the amount due for that apartment will appear on the landlord's account.

At the end of the month, the operator closes the update switch (137) twice. Two closures are required to avoid accidental triggering of this function. The microprocessor (32) then updates and concludes its compilations of usage data for each apartment, and using rate information stored in its memory, it calculates a bill for each apartment. This data is then made available to the memory module unit (23), the terminal unit (22) or to the modem unit (21). Such information can also be viewed on the display unit (19). The invention (10) then begins to accumulate data for a new billing period.

An operator can input new rate information by appropriate use of the memory module unit (23), the modem unit (21) or through the terminal unit (22).

This invention (10) includes a very important power failure detection mechanism and power failure protection means. The power failure detection unit (13) allows the invention (10) to detect the coming of a power failure. In the brief moments between when such a failure can be detected and when its effects are immediately felt, the power failure protection unit (14) forces the microprocessor (32) to store certain pertinent information in memory, such as the last address on which it was working, a verification code and PIA input data. The power failure protection unit (14) then protects the RAM units (73 through 75) by inhibiting their ability to be written to. The invention (10) may then power down without risk to the contents of the memory unit (16).

In addition, by provision of the battery unit (15), certain minimal functions can be maintained. In particular, the invention (10) continues to monitor and accumulate pulse data from the main meters being monitored, since these components are provided with a battery backup.

When AC power has been restored, the invention (10) resumes normal operation. An AC power failure LED (158) will be illuminated to signal the operator then an AC power failure has been experienced.

Obviously, numerous modifications and variations of the present invention are possible in light of the above teachings. It is therefore to be understood that within the scope of the appended claims, the invention may be practiced otherwise than as specifically described therein.

We claim:

1. In a submetering apparatus for individually monitoring a plurality of energy consuming units located within a general monitored area, said apparatus comprising power supply means to provide power to said apparatus during normal operation of said apparatus, monitoring means for individually monitoring on-time for said plurality of energy consuming units, time measuring means for individually measuring on-time for each energy consuming unit, memory means for individually storing such measured on-time data, and display means for displaying said measured on-time data, an improvement comprising:

(a) the provision of a main processing unit, which main processing unit includes said time measuring means and which further operates to monitor main meter consumption data, said improvement further comprising main meter monitoring means for monitoring consumption for said general monitored area, and wherein said memory means stores such measured consumption data and wherein said display means can further operate to display said general consumption; and (b) power failure detection means for sensing an impending AC power failure and power failure protection means for responding to said power failure detection means and for protecting data stored in said memory means in the event of a power failure.

2. The improvement of claim 1 and further including a battery unit operably connected to at least part of said memory means and to said main meter monitoring means for preserving data stored in said connected part of said memory unit and for preserving the function of said main meter monitoring means during an AC power failure.

3. The improvement of claim 1 wherein said display unit further operates to display indicia that an AC power failure has occurred following such a power failure.

4. The improvement of claim 3 wherein said display unit further includes indicia to indicate that a battery unit power failure has occurred following such a power failure.

5. The improvement of claim 1 and further including modem means for allowing said main processing unit to interact over telephone lines with other processing units.

6. The improvement of claim 1 and further including terminal means for allowing said main processing unit to interact with peripheral data entry or data retrieval units other than said display means or said memory module means.

7. In a submetering apparatus for individually monitoring a plurality of energy consuming units located within a general monitored area, said apparatus comprising power supply means to provide power to said apparatus during normal operation of said apparatus, monitoring means for individually monitoring on-time for said plurality of energy consuming units, time measuring means for individually measuring on-time for each energy consuming unit, memory means for individually storing such measured on-time data, and display means for displaying said measured on-time data, an improvement comprising:

(a) the provision of a main processing unit, which main processing unit includes said time measuring means and which further operates to monitor main meter consumption data, said improvement further comprising main meter monitoring means for monitoring consumption for said general monitored area, and wherein said memory means stores such measured consumption data and wherein said display means can further operate to display said general consumption;

(b) power failure detection means for sensing an impending AC power failure and power failure protection means for responding to said power failure detection means and for protecting data stored in said memory means in the event of a power failure; and (c) control switch means for controlling at least certain functions of same said main processing unit and said display unit.

8. The improvement of claim 7 wherein said control switch means further includes a plurality of vacant/occupied switches such that an operator may indicate to said apparatus that a particular monitored energy consuming unit is in a vacant or occupied monitored area, as the case may be.

9. In a submetering apparatus for individually monitoring a plurality of energy consuming units located within a general monitored area, said apparatus comprising power supply means to provide power to said apparatus during normal operation of said apparatus, monitoring means for individually monitoring on-time for said plurality of energy consuming units, time measuring means for individually measuring on-time for each energy consuming unit, memory means for individually storing such measured on-time data, and display means for displaying said measured on-time data, an improvement comprising:

(a) the provision of a main processing unit, which main processing unit includes said time measuring means and which further operates to monitor main meter consumption data, said improvement further comprising main meter monitoring means for monitoring consumption for said general monitored area, and wherein said memory means stores such measured consumption data and wherein said display means can further operate to display said general consumption; and (b) memory module means for allowing a portable memory unit to be operably connected to said memory means and main processing means such that at least some data stored in said memory means can be loaded into said memory module means, and said memory module means may then be removed from operable interaction with said apparatus and removed to another location where the data contained therein can be utilized.

* * * * *